(12) United States Patent
Chesters

(10) Patent No.: US 7,006,074 B2
(45) Date of Patent: Feb. 28, 2006

(54) MULTIMODAL POINTER METHOD

(76) Inventor: Thomas Peter Chesters, 1901 Marigold La., Hanover Park, IL (US) 60133

( * ) Notice: Subject to any disclaimer, the term of this patent is extended or adjusted under 35 U.S.C. 154(b) by 364 days.

(21) Appl. No.: 10/235,883

(22) Filed: Sep. 5, 2002

(65) Prior Publication Data

US 2004/0046732 A1 Mar. 11, 2004

(51) Int. Cl.
G09G 5/08 (2006.01)

(52) U.S. Cl. ........................................ 345/156; 345/161
(58) Field of Classification Search .................. 345/156, 345/161, 163, 164, 157, 160, 158; 341/20, 341/21; 74/174 XY
See application file for complete search history.

(56) References Cited

U.S. PATENT DOCUMENTS

| | | |
|---|---|---|
| D291,318 S | 8/1987 | Kim |
| 5,063,289 A | 11/1991 | Jasinski |
| D340,042 S | 10/1993 | Copper |
| 5,280,276 A | 1/1994 | Kwok |
| 5,287,090 A | 2/1994 | Grant |
| D347,833 S | 6/1994 | Bisenius |
| 5,355,147 A | 10/1994 | Lear |
| 5,457,479 A | 10/1995 | Cheng |
| 5,506,605 A | 4/1996 | Paley |
| 5,648,798 A | 7/1997 | Hamling |
| 5,668,574 A | 9/1997 | Jarlance-Huang |
| 5,712,725 A | 1/1998 | Faltermeier |
| 5,726,684 A | 3/1998 | Blankenship |
| 5,767,841 A | 6/1998 | Hartman |
| D425,046 S | 5/2000 | Bering |
| 6,222,526 B1 | 4/2001 | Holmes |
| 6,422,942 B1 | 7/2002 | Jeffway, Jr. |
| 6,545,667 B1 | 4/2003 | Lilenfield |
| 6,556,150 B1 | 4/2003 | McLoone et al. |
| 6,744,421 B1 | 6/2004 | Lilenfield |
| 2001/0035856 A1 | 11/2001 | Myers |

FOREIGN PATENT DOCUMENTS

| | | | |
|---|---|---|---|
| GB | 2 244 546 A | * | 4/1991 |
| JP | 363200266 A | * | 8/1988 |
| JP | 11073276 A | | 3/1999 |
| NL | 1197915 A1 | | 4/2002 |
| WO | WO 01/69361 A2 | | 9/2001 |

OTHER PUBLICATIONS

Penny & Giles Computor Products–Online Catalog Aug. 2, 2002 Penny Giles.com.

* cited by examiner

Primary Examiner—Amare Mengistu

(57) ABSTRACT

A multimodal pointer method, comprising an elongated, graspable, control shell (301) which has a rotatable, multi-axis control ball encoder (302) positioned so that it may be used in multiple modes, with a minimum of two function keys (307, 308) that can be used in all modes. The device may either be used at various orientations in-air, or be used in-air against a surface, or may be used downward on a side on a surface and used as a mouse, or be alternately used upward on a side as a trackball, and, in a preferred embodiment, may be used upright on its base (335), or on a cooperative static or dynamic, surface or suspension base stand (339, 338) which introduces other cooperative features. The method further comprehends the incorporation of a second, front or side-mounted pointer device, typically a single-axis wheel encoder (328) or a multi-axis auxiliary control ball encoder, and other programmable switches, and may be used either wired or wirelessly using incorporated or intermediately connective data transmission components.

17 Claims, 17 Drawing Sheets

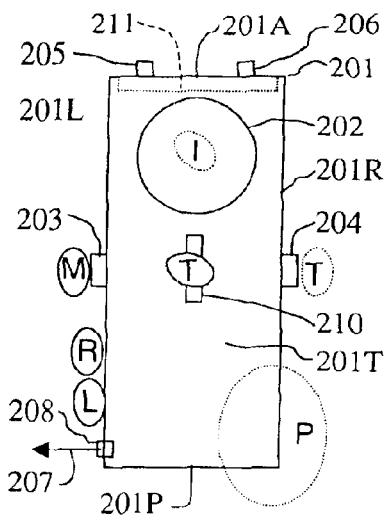
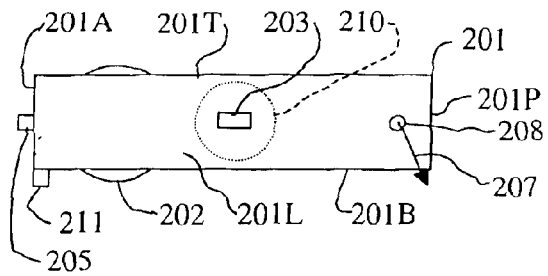
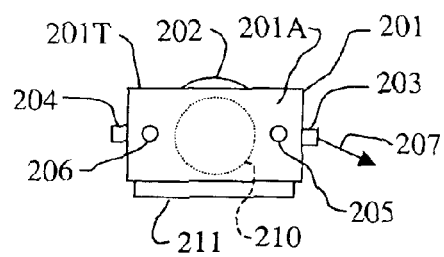
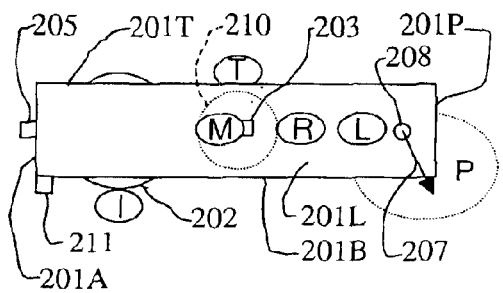
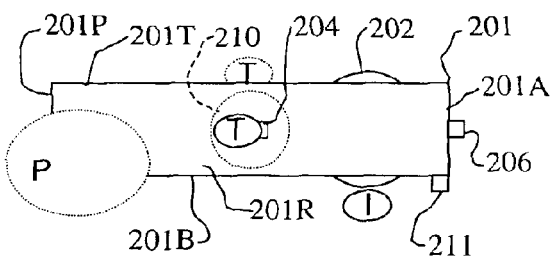
Fig. 2
Fig. 2A
Fig. 2B
Fig. 2C
Fig. 2D

MULTIMODAL POINTER METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

1. Field of Invention

This invention relates to computers, and more specifically to a mouse, trackball, and other pointer devices.

2. Description of Prior Art

Prior art work-surface mice and base-mounted trackball pointer devices are simple, easy to operate, intuitive devices. They only have to be intermittently focused on to be utilized. They are typically situated within the range of peripheral vision and within easy operational reach. And they respectively have appreciated features such as the scroll, autoscroll and zoom controls, and often have programmable keys. However, work surface mouse or trackball operation requires a continuous close proximity to the display screen. It is not possible to lean back in a chair while operating a standard mouse or trackball pointer device, or to change the orientation of either device during operation. This inability to change use orientation and distance from the work surface contributes to the general fatigue of the work day. Other associated problems with the use of a mouse or trackball are occasional discomfort and pain from the repetitive left-right and forward-backward hand, wrist and arm motions involved when these pointer devices are continuously used during a typical work day. Various types of mice, trackballs and other pointer devices have been patented which attempt to overcome these problems by being made more ergonomically correct, or being useable in-air, i.e., being hand-held away from a work surface, or by having function keys which are differently positioned to the side or to the front, or by being palm-held so that they will enable use of the keyboard while holding the pointer device. And still other pointer devices have been patented which attempt to overcome these problems by being made useable in more than one mode of operation, such as a combined mouse and trackball.

What would be novel and useful in the field of pointer devices would be an improved "multimodal" pointer device that is: a. an inexpensive, practical, simple and easy to operate, intuitive device, which does not have to be continuously focused on to be utilized; b. which is typically situated within the range of peripheral vision and within easy operational reach; c. which has appreciated features such as scroll, autoscroll and zoom controls, and programmable keys; d. which takes advantage of ergonomic design and both vertically aligned and horizontal side-by-side function key methods; e. which can be used at will in differing spatial orientations and operational contexts, wired or wirelessly, so as to simulate either a typical mouse, or a typical trackball, or a typical palm-held in-air device, and possibly be used as well upright on its own base, or in a cooperative surface or suspension base stand wherein it may be provided with further features such as an angled support method or a tactile sensation feature.

SUMMARY

A multimodal pointer method, comprising an elongated, graspable, control shell which has a rotatable, multi-axis control ball encoder positioned so that it may be used in multiple modes, with a minimum of two function keys that can be used in all modes. The device may either be used at various orientations in-air, or be used in-air against a surface, or may be used downward on a side on a surface and used as a mouse, or be alternately used upward on a side as a trackball, and, in a preferred embodiment, may be used upright on its base, or on a cooperative static or dynamic, surface or suspension base stand which introduces other cooperative features. The method further comprehends the incorporation of a second, front or side-mounted pointer device, typically a single-axis wheel encoder or a multi-axis auxiliary control ball encoder, and other programmable switches, and may be used either wired or wirelessly using incorporated or intermediately connective data transmission components.

OBJECTS AND ADVANTAGES

Accordingly, the present invention of a multimodal pointer method in its various shown and described basic, preferred and alternate embodiments, has the objects and advantages of being an elongated, typically rectangular parallelepiped (box-like) or elliptical-cylinder shaped, hand-held and digit-operated, multimodal pointer device, which may be alternately used at will in numerous different operational modes. The following explanations are described primarily for use with a preferred embodiment utilizing a right hand, which if reversed would apply to a left hand.

In the first four modes, a preferred embodiment of the device is initially held in a length-upright position and grasped by a left or right hand placed on edge, with the palm parallel to the elongated side of the device, and with the little finger down. In this length-upright grasping position, a first provided upper-frontal or otherwise positioned pointer controller, typically a rotatable, multi-axis, fixed-position control ball encoder with at least one side exposed, may be operated by an index finger and/or thumb, while a minimum of two provided frontally aligned or horizontally disposed function keys, may be operated by the fingers and thumb. The fingers or thumb may also operate a second provided pointer device, typically a (then) vertically disposed, recessed, single-axis encodable wheel encoder, along with other programmable function keys.

Given that the first pointer device is a rotatable, multi-axis, fixed-position control ball encoder exposed on at least one side, and the second pointer device is a recessed wheel encoder utilized as a scroll wheel, and given that the device has either a wired or wireless connection with a computer with a display screen:

a. in a first mode, the preferred embodiment of the device is used while standing on its bottom base; b. in a second mode, the device is used while connective with a cooperative static or dynamic (force-felt) surface or suspension base stand; c. in a third mode, the device is used in-air at any orientation; d. in a fourth mode, the control ball in the device is used for "stroking" against any horizontal, vertical, or curved surface edge; e. in a fifth mode, the device is turned to one of its sides so that the control ball is facing downward on provided slides in contact with a continuous surface, horizontal, vertical, or curved wherein the device may then be utilized as a conventional mouse on any suitable continuous surface, horizontal, vertical, or curved, and so that the recessed scroll wheel may be alternately operated while the device is on its side; f. in a sixth mode, the device is on a side with the control ball facing upward on one or more provided supports so that the control ball may be utilized as a trackball, and so that the recessed scroll wheel may be alternately operated while the device is on its side.

The invention has numerous additional primary objects. The invention retains the advantages of the prior art of being a simple and intuitive device able to be kept within easy grasp on a user's work surface, and having the typical mouse and trackball function features of the prior art. The invention is able to be used as a comfortably held and simple to operate, lightweight, work surface area pointer device that can be used wired or wirelessly, in-air, or on its base, or in a base stand, or on a work surface or a mouse pad. The invention utilizes inexpensive components and is relatively easy to manufacture, maintain, and repair. The invention may be held by a hand placed on edge so that the index finger may manipulate either a multiple or single-axis encoder, and so that the thumb against a side of the device can manipulate either a single or multiple-axis encoder, or the invention may be held while on its side in an alternate grasp which is similar to a standard mouse grasp. The invention may stand on its own base or be set within a cooperative base stand or suspension stand that takes up no more desk space than a typical mouse pad. The invention may be used in a typically vertical manner, but also may be tilted in any direction unto various horizontal positions to reduce fatigue. The invention may have further provided, easily reached and actuated, programmable switchwork and actuators for such functions as are typical for a standard mousing method because of its increased surface area relative to a standard mouse, and the increased ability of the fingers to reach around the surface area of its embodiments. The invention may have a base which is contoured to the hand, or be further connectively mounted on a static or dynamic base stand which is contoured to the hand. The invention is designed to accommodate all hand sizes. The invention may have a provided internal wireless transmitter module, or be enabled to be made connective with an external wireless transmission module. The invention may be used in any of numerous operational modes by simple orientational and operational changes.

Given the state of the art of pointer devices and the obvious reliance of the prior art on control methods that have been in effect for decades, what would be novel, as well as useful, would be to take what the prior art has to offer to date in terms of multiple and single-axis-encoding devices and begin anew in a different, non-standard arrangement of these components. It is thus a primary object of the invention is to provide a simplified starting format for a multimodal, ergonomic, pointing method that may be effectively applied for use in-air, on a base, on a base stand, or when rolled on a surface as a standard mouse would be, or when used in a fixed position as a trackball. Once this basic format is achieved, the method of the invention may be utilized to add into the circuitry of the device a number of possible configurations of typical function key controls and add-on switchwork for various mouse-type functions through the use of miniaturized switching methods already available, but not previously used in the method of the invention.

Accordingly, some of the other primary objects of the present invention of an alternate, multimodal pointer method and its implementation devices, are to provide: a. various types of lengthened and relatively slender control shells which utilize inexpensive, standard mouse hardware and software; b. a method of spatial distribution and configuration of standard and modified mouse and trackball components that offers a significantly different, more efficient and practical, as well as more ergonomic user format for a pointing method. These improvements will have the advantages of providing a simple, lightweight, efficient, inexpensive, easily grasped, operated and controlled, multimodal pointer method that can act in lieu of prior art pointing methods.

Further objects and advantages of this invention will become apparent from a consideration of the drawings and ensuing descriptions thereof.

DESCRIPTION OF DRAWING FIGURES

FIG. 2 shows a pictorial overhead view of the second basic embodiment of the invention in use in an in-air mode with a control ball that is protrudingly exposed to the top and bottom sides of the embodiment. The shown right-hand fingering is being performed by a palm-up right hand supportably controlling the embodiment.

FIG. 2A shows a pictorial left side horizontal view of the embodiment of FIG. 2.

FIG. 2B shows a pictorial front horizontal view of the embodiment of FIG. 2.

FIG. 2C shows a pictorial left side horizontal view of the embodiment of FIG. 2 being used in an in-air mode, with palm-up, right-hand fingering equivalent to FIG. 2.

FIG. 2D shows a pictorial right side horizontal view of the embodiment of FIG. 2 being used in an in-air mode, with palm-up, right-hand fingering equivalent to FIG. 2.

REFERENCE NUMERALS IN DRAWINGS

Figure 1:
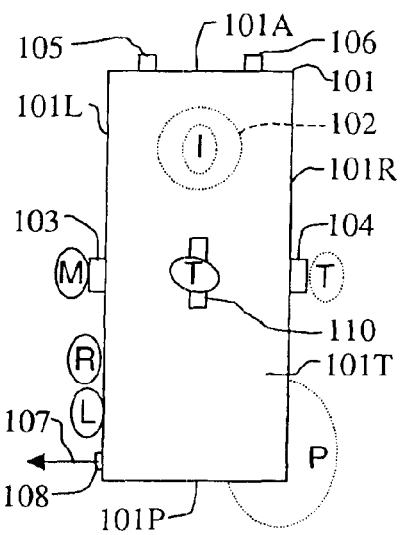
FIG. 1 shows a pictorial overhead view of the first basic embodiment of the invention in use in an in-air mode with a control ball (shown in hidden lines) protrudingly exposed below the bottom side of the embodiment. The shown right-hand fingering is being performed by a palm-up right hand supportably controlling the embodiment.
Figure 1A:
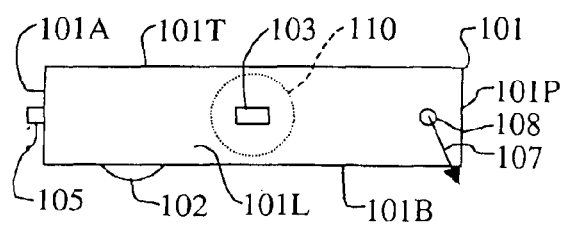
FIG. 1A shows a pictorial left side horizontal view of the embodiment of FIG. 1.
Figure 1B:
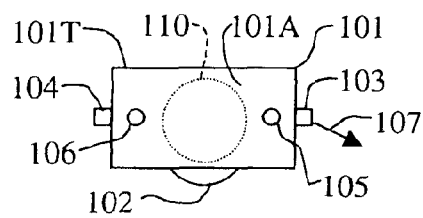
FIG. 1B shows a pictorial front horizontal view of the embodiment of FIG. 1.
Figure 1C:
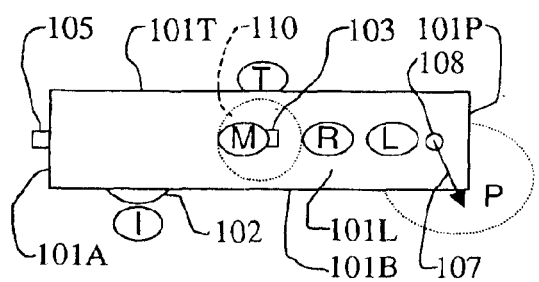
FIG. 1C shows a pictorial left side horizontal view of the embodiment of FIG. 1 being used in an in-air mode, with palm-up, right-hand fingering equivalent to FIG. 1.
Figure 1D:
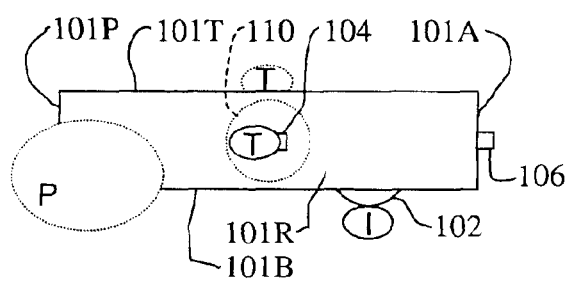
FIG. 1D shows a pictorial right side horizontal view of the embodiment of FIG. 1 being used in an in-air mode, with palm-up, right-hand fingering equivalent to FIG. 1.
Figure 1E:
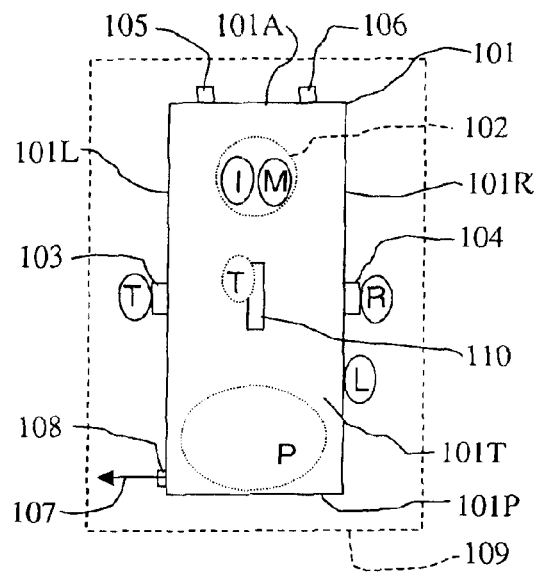
FIG. 1E shows an overhead view of the embodiment of FIG. 1 in a horizontal position for use in a mouse mode by a palm-down right hand.
Figure 1F:
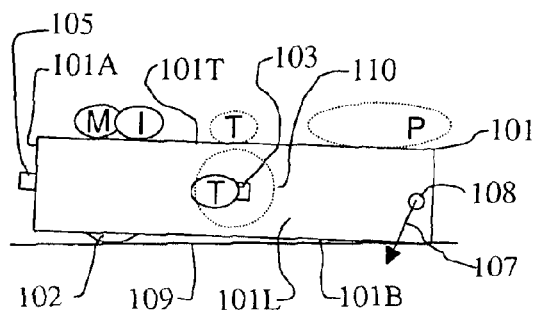
FIG. 1F shows a left side view of the embodiment of FIG. 1 in use in a mouse mode.
Figure 1G:
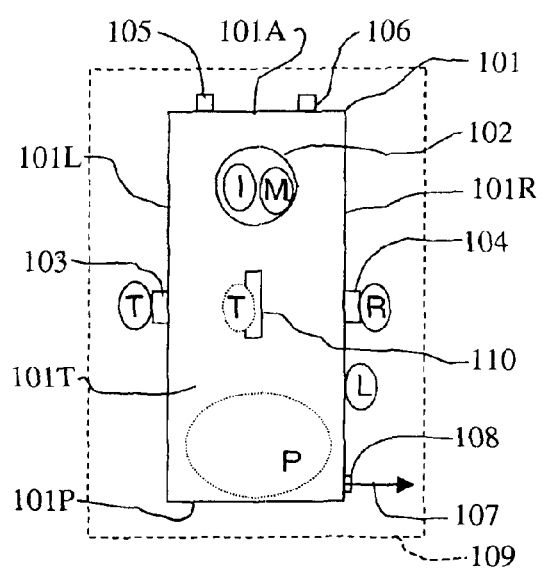
FIG. 1G shows an overhead view of the embodiment of FIG. 1 in a horizontal position for use in a trackball mode by a palm-down right hand.
Figure 1H:
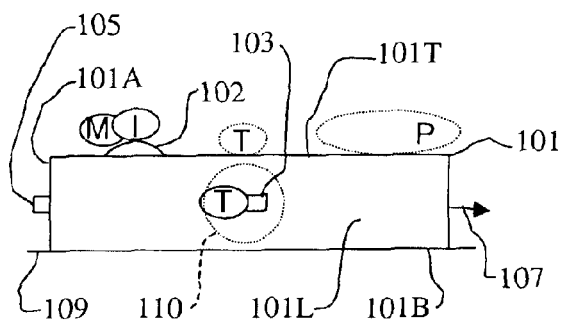
FIG. 1H shows a left side view of the embodiment of FIG. 1 in use in a trackball mode.
Figure 2E:
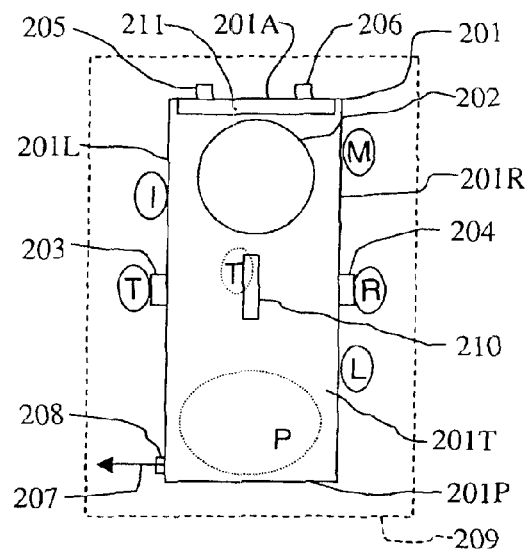
FIG. 2E shows an overhead view of the embodiment of FIG. 2 in a horizontal position for use in a mouse mode by a palm-down right hand.
Figure 2F:
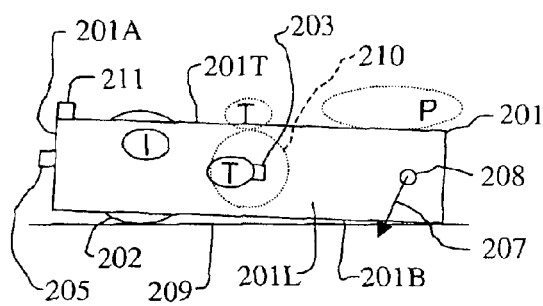
FIG. 2F shows a left side view of the embodiment of FIG. 2 in use in a mouse mode.
Figure 2G:
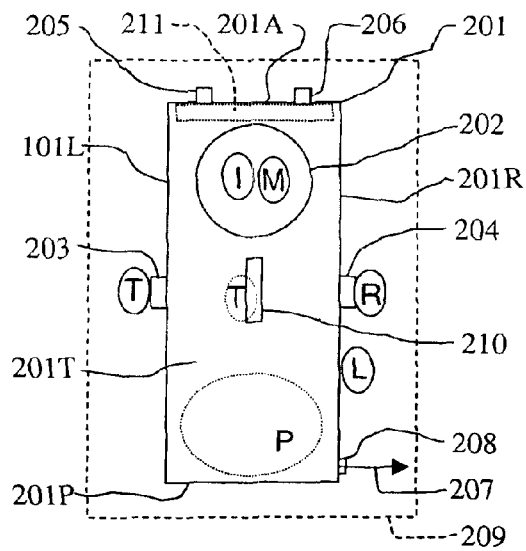
FIG. 2G shows an overhead view of the embodiment of FIG. 2 in a horizontal position for use in a trackball mode by a palm-down right hand.
Figure 2H:
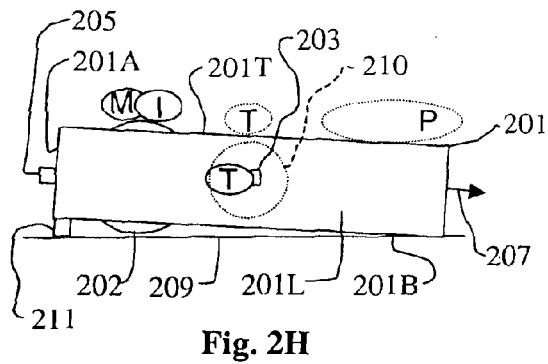
FIG. 2H shows a left side view of the embodiment of FIG. 2 in use in a trackball mode.

FIGS. 1–1H Reference Numerals
101=control shell
101L=left side of control shell
101R=right side of control shell
101A=front side of control shell
101P=rear side of control shell
101T=top of control shell
101B=bottom of control shell
102=control ball
103=first mouse button
104=second mouse button
105=encoder reverser switch
106=left-right function key reverser switch
107=standard I/O wiring cable
108=I/O cable exit hole
109=work surface
110=single-axis wheel encoder
FIGS. 2–2H Reference Numerals
201=control shell
201L=left side of control shell
201R=right side of control shell
201A=anterior side of control shell
201P=posterior side of control shell
201T=top of control shell 201B=bottom of control shell
202=control ball
203=first mouse button
204=second mouse button
205=encoder reverser switch
206=left-right function key reverser switch
207=standard I/O wiring cable
208=I/O cable exit hole
209=work surface
210=single-axis wheel encoder
211=trackball support
FIGS. 3–27 Reference Numerals
301=control shell
301A=upper frontal control ball opening in 301
301B=frontal horizontal slot for 303C
301C=control shell bottom material
301D=control shell top material
301E=top magnetically attractable material plate
301F=bottom magnetically attractable material plate
302=control ball
303=upper ring collar
303A=upper ring collar holder
303B=upper ring collar screw bolt
303C=upper ring collar screw bolt extended lever
303D=upper ring collar screw bolt screw hole
303E=upper ring collar screw bolt circuit board hole
304=lower ring collar
305=rear encoding sensor
306=lower encoding sensor
306A=lower sensor access hole in 325
307=upper rear edge function key
307A=upper rear edge function key miniswitch
308=upper front function key
308A=upper front function key miniswitch
309=lower front function key
309A=lower front function key miniswitch
310=front upper left side function key
310A=front upper left side function key miniswitch
311=rear upper left side function key
311A=rear upper left function key miniswitch
312=front upper right side function key
312A=front upper right side function key miniswitch
313=rear upper right side function key
313A=rear upper right side function key miniswitch
314=left lower rear side function key
314A=left lower-rear-side function key miniswitch
315=right lower rear side function key
315A=right lower-rear-side function key miniswitch
307B–315B=key push-on holes
307C–315C=key push stems
307D–315D=recessed key slide holes
307E–315E=circular stem guide holes
307F–315F=inner washers
307G–315G=contact endpieces
316=right hand
316A=right palm
317=I/O cable
317A=I/O cable lower frontal exit hole
317B=standard pin plug connector
317C=alternate wireless transmission path
317D=RM I/O cable to MCS
318=double pin-plugged I/O cable
318A=alternate connector port
318B=alternate circuit path of 317
318C=double-pin-plug connector first pin plug
318D=double-pin-plug connector second pin plug
318E=alternate shorter version of double-pin-plugged cable
318F=Base Stand connector port
318L=Base Stand alternate wireless transmission path
319=upper section of lower brace structure
319A=front section of lower brace structure
319B=middle section of lower brace structure
319C=rear section of lower brace structure
319D=cover half pin plug
319E=support half pin plug
319F=middle brace wheel hole
320=upper horizontal support brace
321=upper horizontal circuit board
321A=lower front vertical circuit board
321B=lower frontal brace piece
321C=upper-rear-side vertical circuit board
322=upper front recessed area
322A=middle front recessed area
322B=lower front recessed area
322C=rear recessed area
323=minor elliptical axis
323A=major elliptical axis
324=upper ball-cross member support plate
324A=upper cross-clasp for 321B
325=lower ball-cross-member support plate
325A=lower cross-clasp for 321B
326=encoder sensors reverser key
326A=encoder sensors reverser miniswitch
326B=push-on key hole
326C=push stem
326D=recessed key slide hole
326E=circular stem guide hole
326F=inner washer
326G=contact endpiece
327=diamond-shaped mounting block
327A=mounting block cable hole for 317
328=single-axis encoding wheel
328A=left recessed opening for wheel 328
328B=right recessed opening for wheel 328
328C=left wheel slot
328D=right wheel slot
328E=wheel indicia
328F=wheel axle
328G=left wheel axle support
328H=right wheel axle support
328I=wheel LED
328J=wheel photodiode
328K=wheel surface
328L=larger wheel enclosure
329=computer mouse-type port
330=I/O cable linking Computer with Display Screen
331=rear ball-vertical support plate
332L=top left slide
332R=top right slide
333L=bottom left slide
333R=bottom right slide
334=top rotatable support
334A=top frontal grip tab
334B=top axle cap
334C=top left locking peg
334D=top right locking peg
334E=top axle-cap retaining hole
334F=top support locking hole set
335=bottom rotatable support
335A=bottom frontal grip tab
335B=bottom axle cap
335C=bottom left locking peg
335D=bottom right locking peg
335E=bottom axle-cap retaining hole 335F=bottom support locking hole set
336=horizontal work surface
337=vertical surface
338=magnetic suspension hanger stand
338A=upper magnetic material plate
338B=horizontal hanger member
338C=vertical member
338D=horizontal member adhesive backing
338E=vertical member adhesive backing
339=surface base stand
339A=support base
339B=metal weight
339C=horizontal slot for comfort-support pad
339D=support base upper magnetic material plate
339E=base stand pin-plug receptacle
340=omnidirectional ball housing
340A=lower magnetically attractable material
340B=thin metal rod
340C=rotatable ball
340D=left ring collar
340E=right ring collar
340F=left vertical support post
340G=right vertical support post
340H=adjustable knobbed bolt
340I=ball housing lower magnetically attractable material plate
340J=upper rod access hole
341=comfort-support pad
341A=pad forward connector
341B=oval groove in pad
FIGS. 28–37 Reference Numerals
28A=a vertically-orientated single-axis wheel encoder
28B=a recessed multi-axis control ball encoder
28C=an extended multi-axis control ball encoder
28D=a control shell
30A=a recessed multi-axis control ball encoder
30B=an extended multi-axis control ball encoder
30C=a horizontally-orientated single-axis wheel encoder
30D=an alternate control shell
32A=an horizontally-orientated single-axis wheel encoder
32B=a recessed multi-axis control ball encoder
32C=an extended multi-axis control ball encoder
32D=an alternate control shell
34A=a first recessed multi-axis control ball
34B=a first extended multi-axis control ball
34C=a second recessed multi-axis control ball
34D=a second extended multi-axis control ball
34E=an alternate control shell
Other Reference Notation Used
AC=external power source
Base Stand=Base Stand
Computer=Computer
Display Screen=Display Screen
+=cursor icon
>=pointer icon
LB=Logic Board
MCS=Mouse Control Software
PS1=internal power source
PS2=base stand power source
RC=recharger unit system
RM=receiver module
S1=PS1's on-off switch
S2=PS2's on-off switch
TFM1=internal Tactile Feedback Module
TFM2=base stand Tactile Feedback Module
WTM1=internal Wireless Transmitter Module
WTM2=base stand Wireless Transmitter Module
T=thumb
I=index finger
M=middle finger
R=ring finger
L=little finger
P=palm of a hand
XXX=electronic components within 339

DESCRIPTION AND OPERATION

FIGS. 1–2H—Basic Embodiments

In order to properly explain the present invention of a multimodal pointer method, it will be more clear to the reader if the specification begins with a cursory account of the rudimentary embodiments of the invention in terms of FIGS. 1–2H, and then proceeds to explain the more complex, preferred embodiment of FIGS. 3–20 in detail. Since the various embodiments of a multimodal device represent only sizing and configurational changes in the well known elements of the prior art, the included circuitry and switchwork in the various multimodal devices shown and described may be fairly termed standard or conventional in the art, and therefore require little detailed explanation. The description of materials used, sizing, and other relevant information which is given for the preferred embodiment of FIGS. 3–20 will also generally apply to the basic embodiments of FIGS. 1–2H discussed below.

In the rudimentary embodiments of the invention as shown in FIGS. 1–2H, a rotatable, multi-axis control ball encoder is utilized as a multi-axis pointer device with either one control surface or two surfaces, protrudingly exposed. The basic embodiments are primarily used in a horizontal orientation. In the preferred embodiment of FIGS. 3–20, three control surfaces, a left, front and right, are protrudingly exposed. The preferred embodiment is primarily used in a vertical mode, but may be used in horizontal and other orientation modes as well. This primary orientation distinction between the basic embodiments and the preferred leads to orientational description issues.

Whenever one is confronting a three dimensional object with plural sides which respectively have a definitive horizontal orientation in space, such as a standard mouse or trackball pointer device would have, it is usually clear as to where a top-bottom, front-rear, and left-right should be. As stated above, whereas, the basic embodiments shown in FIGS. 1–2H have a primarily horizontal use orientation, the preferred device of the multimodal pointer method shown in FIGS. 3–20 can be orientated in various use directions such as vertical, horizontal, on-edge, or tilted. If the respective top-bottom, front-rear, and left-right of the basic embodiments are described in the same way as the top-bottom, front-rear, and left-right sides of the preferred embodiment, the explanation will suffer. Therefore, in order to simplify the issues of descriptive terms for the top-bottom, front-rear, and left-right for the respective embodiments, two distinct sets of orientational reference terms will be utilized for the top-bottom, front-rear, and left-right for the respective embodiments. Although the basic device and the preferred device are essentially the same multimodal device with variations in pointer device positioning and the number of function keys available, the different sets of orientational descriptors for the top-bottom, front-rear, and left-right for the respective embodiments will make it easier to explain the basic operating principles of a multimodal device.

At each of the three stages of differing uses of a rotatable, multi-axis control ball encoder, that is, with one, two, or three control surface sides protrudingly exposed, the implementation devices of the multimodal pointer method rely on two interacting principles: a. the cooperation of multifunctional components; b. the non-interference of all components with each other and with the user during mode changes. In the preferred embodiment of FIGS. 3–20, with three control surfaces exposed, the device has all the advantages of the rudimentary embodiments and offers the additional advantages of: a. being operable in an upright position on its on base; b. being operable within a cooperative surface or suspension, static or dynamic base stand.

In FIGS. 1–2H, basic embodiments of the invention are respectively shown as right-handed operated devices with suggested right-handed fingering positions shown. A mirror image set of the devices and fingering positions shown would apply for a left-handed operation. In FIGS. 1–2H, right-handed fingering positions are represented by the letters and equivalents which follow: a "T" is a thumb; an "I" is an index finger; an "M" is a middle finger; an "R" is a ring finger; and an "L" is a little finger, each of which letter symbols has been respectively placed within an enclosing oval. A regular-line enclosing oval represents a primary fingering position, and a dotted-line enclosing oval represents an alternate fingering position. The lower thumb-joint ball area of a palm is represented in FIGS. 1–2H by a "P" placed within an enclosing, larger-order, dotted-line oval.

First Basic Embodiment

A first basic embodiment of a multimodal pointer method according to the present invention is described below in terms of FIGS. 1–1H. FIGS. 1–1H diagrammatically illustrate a basic way in which the invention may be embodied for horizontal use with a right hand utilizing a finger-operated, frictionally engaged, rotatable, multi-axis encoder pointer device, a control ball 102, with one control surface side of control ball 102 protrudingly exposed from a bottom side 101B of a control shell 101. Mirror image drawings of FIGS. 1–1H would duplicate the device for use with a left hand. As will be later explained in terms of the preferred device of FIGS. 3–20, the fixed position of control ball 102 is maintained by utilizing a cage method wherein a set of upper and lower ring collars hold control ball 102 in a fixed position during any rotation.

Referring to FIG. 1, which shows a first basic embodiment of the invention, and to FIGS. 1A, 1B, which respectively show a left side and front side view of the embodiment, the essential structure of this multimodal device consists of: a. a plastic or other suitable material, rectangular parallelepiped, elliptical cylinder, or other similarly box-like support housing, a hollow control shell 101, which has four sides, a left side 101L, a right side 101R, an anterior or front side 101A and a posterior or rear side 101P, and a top side 101T, and a bottom side 101B; b. a multi-axis pointer device which is a spherical, polymeric or cast phenolic resin control ball 102, with two suitably placed encoding sensors perpendicular to each other (not shown), with one control surface side of control ball 102 protruding and exposed from the bottom side 101B of control shell 101 (shown in hidden lines); c. a first mouse-like keying function key, function key 103, which is positioned on the left side 101L of control shell 101; d. a second mouse-like keying function key, function key 104, which is directly opposite of function key 103 and positioned on the right side 101R of control shell 101; e. an encoder reverser switch 105; f. a left-right function key reverser switch 106; g. a standard I/O wiring cable 107, and an I/O cable exit hole 108. FIGS. 1, 1C–1H also show fingering positions in regular and hidden lines as were explained above, and FIGS. 1E–1H additionally show a rectangular, flat work surface 109, or a portion thereof. In the basic embodiment of FIGS. 1–1H, a second, auxiliary, recessed, single-axis wheel encoder, wheel 110, has been added in the mid-central area of control shell 101 between keys 103, 104.

For temporary rest purposes, the first basic multimodal pointer device may be set down horizontally on either its bottom side 101B or top side 101T, or stood upright on its rear side 101P. However, the device cannot be properly operated while standing upright on rear side 101P due to the awkward reaches of the various digits attempting to operate control ball 102, recessed wheel 110, and keys 103, 104, as will be explained more clearly below.

FIG. 1 shows pictorial, in-air, overhead view of the first basic embodiment of the invention with one control surface side of control ball 102 (shown in hidden lines) protrudingly exposed below bottom side 101B of the embodiment. The shown right-hand fingering is being performed by a palm-up right hand supportably controlling the embodiment. To first utilize the device in an in-air mode, the device is lifted from whatever its temporary rest position may be on its bottom side 101B or its top side 101T, or upright on its rear side 101P. A right-handed user then situates the device in a right hand which has its palm P facing upward, so that the front side 101A of control shell 101 is forward and away from the user, the rear side 101P is toward the user, and control ball 102 is facing downward. The bottom side 101B of control shell 101 is then placed within the palm either directly forward or on a slight angle to the right so that as the ring finger R and little finger L naturally encircle the lower left side 101L of control shell 101 they may act together to squeeze control shell 101 into the palm P toward the ball of the lower thumb joint. This places middle finger M in a position where it may either rest just above key 103 on left side 101L, or be easily moved to actuate key 103. This also places thumb T in a position where it may either rest on right side 101R, or easily move over key 104, or move to a position over wheel 110 where it may effectively operate wheel 110. This also then places the index finger I under control ball 102 where finger I may then effectively operate ball 102. When actuated, control ball 102, wheel 110, and keys 103, 104 then send encoded signals through I/O cable 107, which exit control shell 101 through exit hole 108, and which signals are then sent through I/O cable 107 to a computer (not shown) where the signals are used to operate a standard or enhanced mouse-type control software application. Alternate means of circuitry and signal transmission for encoded signals from a multimodal device to a computer are further discussed in terms of the preferred embodiment of FIGS. 3–20.

In the horizontal in-air use position just described, the device may be used as a pointer device in any orientation in which the holding wrist may be tilted or twisted, and then set down again into a temporary rest position horizontally on bottom 101B or top 101T, or vertically on rear 101P. Due to the symmetrical positioning of keys 103, 104 and the middle positioning of control ball 102, which allows the device to be used equally effectively by either a left or right hand while in a horizontal position, as previously mentioned, the device cannot be effectively utilized when held upright by most hands because either control ball 102, wheel 110, or keys 103, 104 will be difficult to reach and effectively operate. While in-air horizontally, the device can also be used in a "stroker mode" where control ball 102 is allowed to frictionally engage a work surface such as work surface 109 to make long horizontal strokes, or short vertical or circular strokes. To use the in-air stroker mode, the user would place index finger I to the right side 101R of control shell 101 to allow control ball 102 to move without interference.

In addition to being used in-air, or in-air against a surface as just described, the device can be altered from its in-air grasp or its current temporary rest position and otherwise utilized in either a mouse or a trackball mode. In FIGS. 1E, 1F, the device is shown in use in a mouse mode. And in FIGS. 1G, 1H, the device is shown in use in a trackball mode.

The device may be used as a mouse whenever laid on bottom side 101B on a mouse pad or other work surface 109. FIG. 1E shows an overhead view of the embodiment of FIG. 1 in a horizontal position for use in a mouse mode by a palm-down right hand. FIG. 1F shows bottom side 101B of the embodiment of FIG. 1 with control ball 102 in use in a mouse mode. In the mouse mode of FIGS. 1E, 1F, control ball 102 rotatably, frictionally engages surface 109, and the lower-rearward edge of bottom 101B slidably engages surface 109. The device is shown held in an alternate grasp wherein index finger I and middle finger M rest toward the frontal portion of top side 101T, and thumb T is positioned on the left side 101L so that it may be used to operate function key 103 or wheel 110, and ring finger R is positioned on the right side 101R so that it may be used to operate function key 104, while little finger L rests right side 101R below ring finger R, while palm P braces the device from above near the rear portion of top side 101T.

Since keys 103, 104 operate as standard left and right mouse-like keys in their functions, which is appropriate for right-handed users, a user who is left-handed would utilize a left-right function key reverser switch 106 at the top 101T of control shell 101 to reciprocally exchange the keying functions of keys 103, 104 so that their respective sets of signals will be correctly interpreted by the operating system of the computer without stopping to perform this function through the standard mouse control software. In the trackball mode, a right-handed user will use switch 106 to reverse the functions of function keys 103, 104, since the device is itself reversed when the control ball 102 is facing upward as bottom side 101B faces upward. In the trackball mode, an encoder circuit reversal switch 105 is actuated. Switch 105 causes the two sensor encoder circuits (not shown) of control ball 102 to reverse their circuitry positions so that the rotational translation of control ball 102 will be reversed so that the separate encoder signal sets will be correctly interpreted by the operating system of the computer.

The device may be used in an upright trackball mode when laid on a work surface 109, as shown in FIGS. 1G, 1H, so that control ball 102 faces upward while control shell 101 is laying on its top side 101T and its bottom side 101B is facing upward from surface 109. The device is then held in an alternate grasp wherein index finger I and/or middle finger M may be used to manipulate the upward-facing control ball 102, and thumb T is on left side 101L where it may rest or be used to operate function key 104, and ring finger R is on right side 101R where it may rest or may be used to operate function key 103, while little finger L rests on right side 101R below ring finger R.

Figure 3:
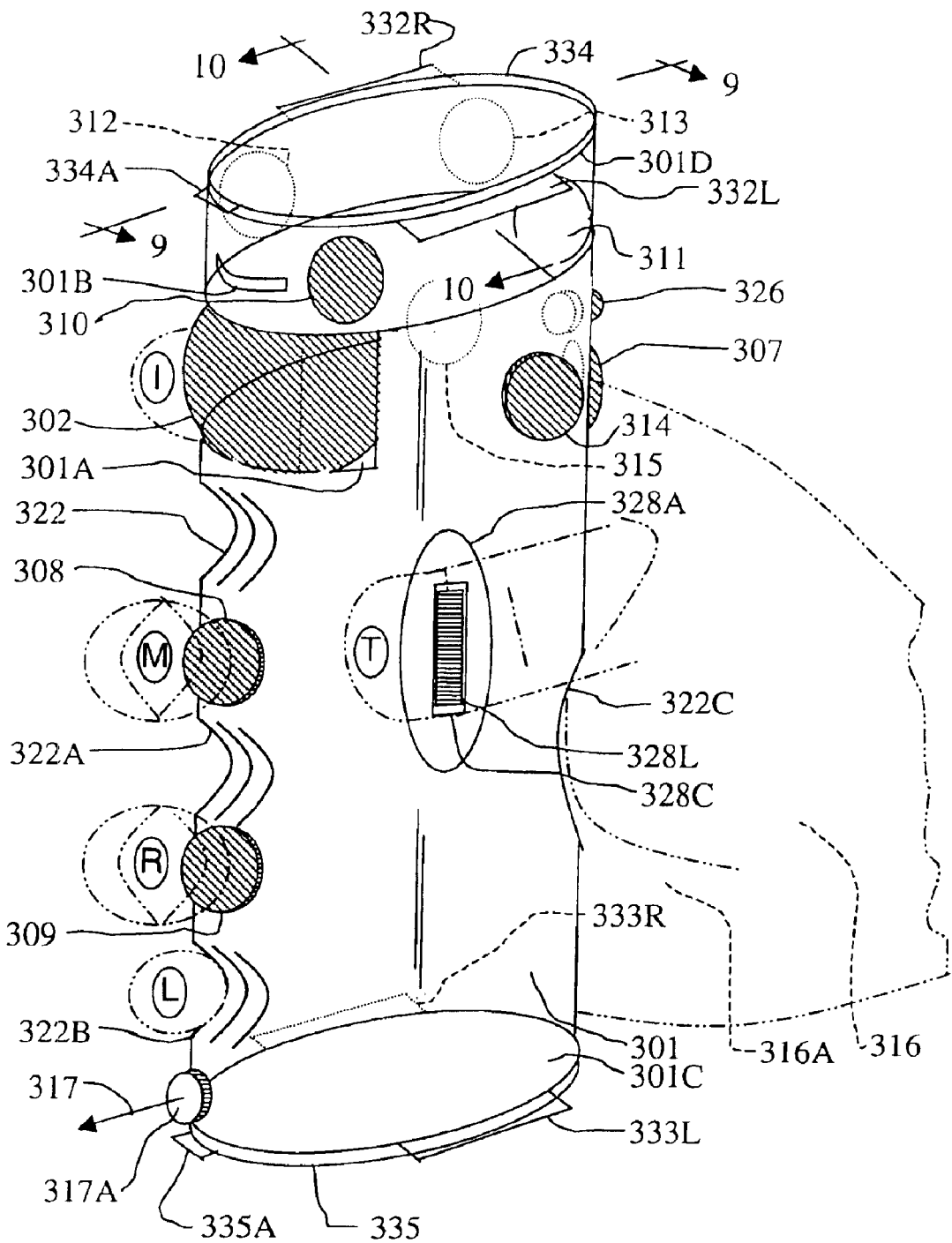
FIG. 3 shows a pictorial perspective view of a preferred embodiment of the invention with a control ball exposed on three sides, a recessed scroll wheel, and a plurality of function keys incorporated into the front, sides and rear of the embodiment. The embodiment is also shown being held on-edge by the thumb and fingers of a right hand.
Figures 21, 22:
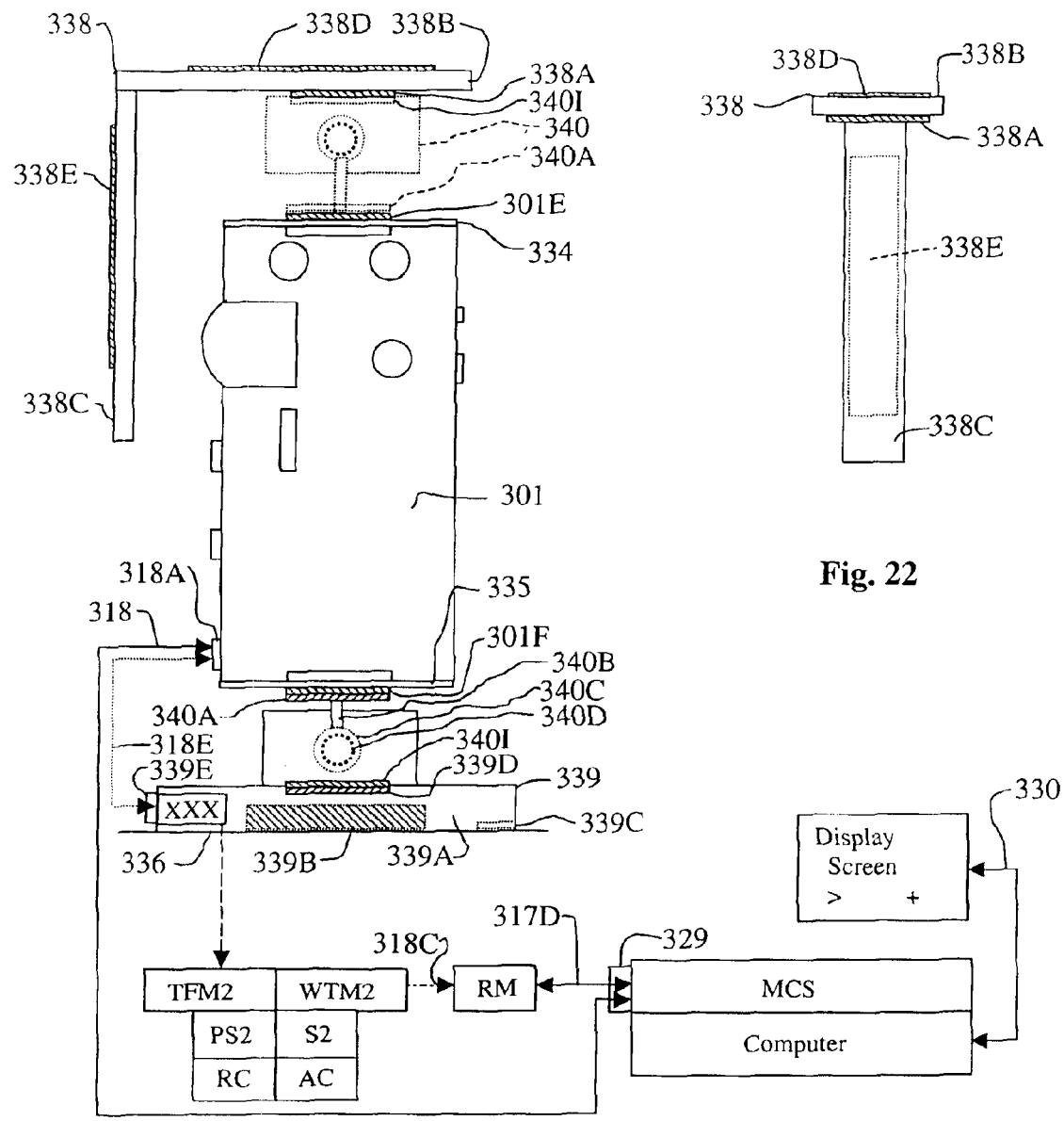
FIG. 21 shows a diagrammatic and schematic perspective view of the device of FIG. 3 mounted on a surface base stand, and also shows a phantom connection with a suspension hanger.
FIG. 22 shows a diagrammatic front view of the suspension hanger of FIG. 21.
Figure 23:
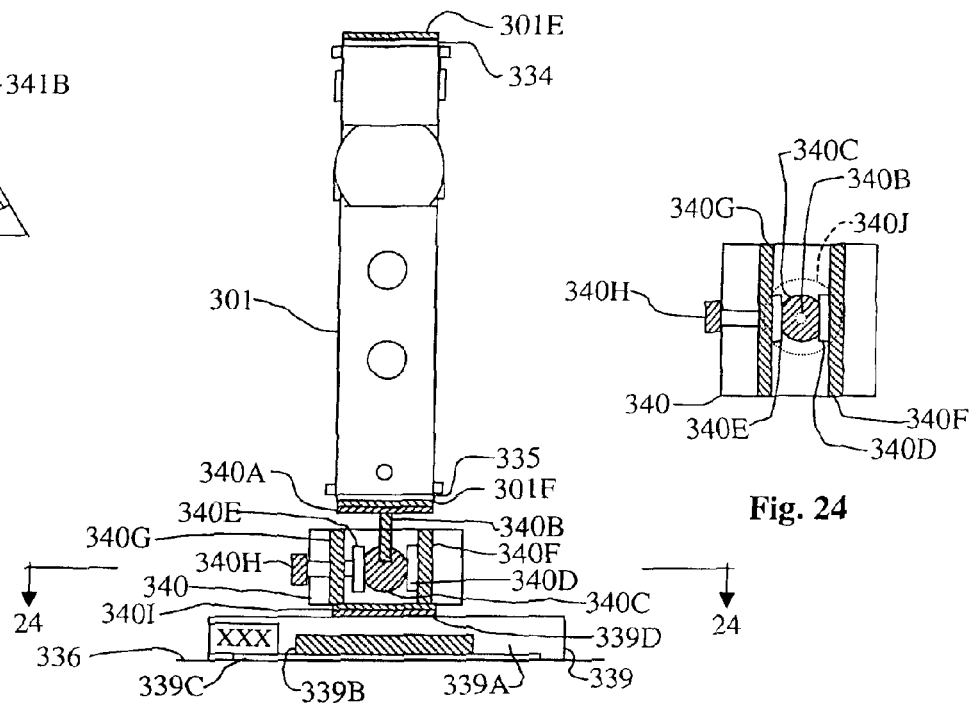
FIG. 23 shows a diagrammatic front view of the base stand of FIG. 21 with a mid-cross section of the support system and support base.
Figure 25:
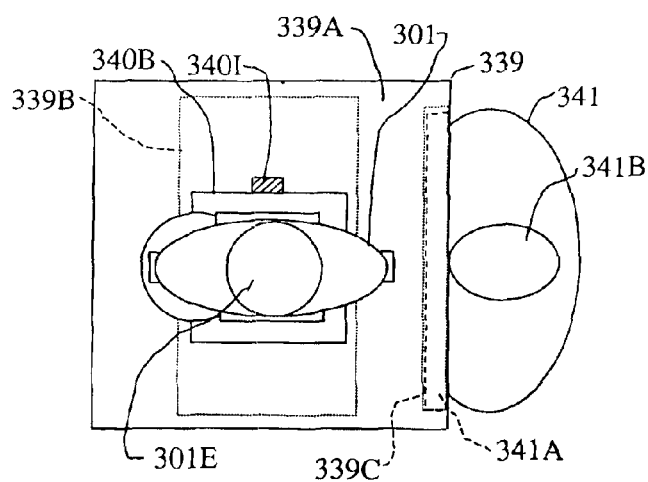
FIG. 25 shows a diagrammatic top view of the base stand of FIGS. 21, 23 and also shows a top view of a comfort-support pad.

The device of FIG. 1 would not be typically utilized within a surface or suspension base stand such as is shown for the preferred embodiment of FIG. 3 in terms of FIGS. 21, 23, 25 because of its inability to be utilized upright as the preferred embodiment may be used.

It should be clear from the above that the essence of a basic embodiment of the invention of a multimodal pointer device is that a multi-axis pointer device, such as control ball 102, be situated within a box-like housing, such as control shell 101, with a minimum of one control surface side of control ball 102 protrudingly exposed, and with a minimum of two mouse-like keys, such as function keys 103, 104 able to be utilized for mouse function control over any multi-axis pointer positioning on a display screen of a computer. Although control ball 102 and function key 103, 104 function ideally in their shown positioning within control shell 101, their functional placement may be somewhat altered without losing multimodal capabilities. Or again, irrespective of the functional placement of the protruding control surface of control ball 102 from within control shell 101, that is, in a more upper or lower position than shown, or whether to the left or right side of control shell 101, and irrespective of the functional placement of the first or second function keys 103, 104 along the edges of control shell 101, whether higher or lower than shown in FIG. 1, the essence of the inventional structure remains the same. This is also true irrespective of which hand appendages (thumb and fingers) are utilized to operate control ball 102 or function keys 103, 104.

Second Basic Embodiment

A second basic embodiment of a multimodal pointer method according to the present invention is described below in terms of FIGS. 2–2H. FIGS. 2–2H diagrammatically illustrate a basic way in which the invention may be embodied for horizontal use with a right hand utilizing a finger-operated, frictionally engaged, rotatable, multi-axis encoder pointer device, a control ball 202, with two control surface sides of control ball 202 exposed respectively to the left and right side of control shell 201. Mirror image drawings of FIGS. 2–2H would duplicate the device for use with a left hand. As will be later explained in terms of the preferred device of FIGS. 3–20, the fixed position of control ball 202 is maintained by utilizing a cage method wherein an upper and lower ring hold control ball 202 in a fixed position during any rotation.

Referring to FIG. 2, which shows a second basic embodiment of the invention, and to FIGS. 2A, 2B, which respectively show a left side and front side view of the embodiment, the essential structure of this multimodal device consists of: a. a plastic or other suitable material, rectangular parallelepiped, elliptical cylinder, or other similarly box-like support housing, a hollow control shell 201, which has four sides, a left side 201L, a right side 201R, an anterior or front side 201A and a posterior or rear side 201P, and a top side 201T and a bottom side 201B; b. a multi-axis pointer device, a spherical, polymeric or cast phenolic resin control ball 202 with two suitably placed encoding sensors perpendicular to each other (not shown), with two control surface sides of control ball 202 protruding and exposed respectively from the left and right sides of control shell 201; c. a first mouse-like keying function key, function key 203, which is positioned on the left side 101L of control shell 201; d. a second mouse-like keying function key, function key 204, which is directly opposite of function key 203 and positioned on the right side 101R of control shell 201; e. an encoder reverser switch 205; f. a left-right function key reverser switch 206; g. a thin, squared, elongated, trackball support member 211 formed into the material of the top left side 101L of control shell 201; h. a standard I/O wiring cable 207 and an I/O cable exit hole 208. FIGS. 2, 2C–2H also show fingering positions in regular and hidden lines as were explained above, and FIGS. 2E–2H additionally show a rectangular, flat work surface 209, or a portion thereof. In the basic embodiment of FIGS. 2–2H, a second, auxiliary, recessed, single-axis wheel encoder, wheel 210, has been added in the mid-central area of control shell 201 between keys 203, 204.

For temporary rest purposes, the first basic multimodal pointer device may be set down horizontally on either its bottom side 201B or top side 201T, or stood upright on its rear side 201P. However, the device cannot be properly operated while standing upright on rear side 201P due to the awkward reaches of the various digits attempting to operate control ball 202, recessed wheel 210, and keys 203, 204, as will be explained more clearly below.

FIG. 2 shows pictorial, in-air, overhead view of the first basic embodiment of the invention with one control surface side of control ball 202 (shown in hidden lines) protrudingly exposed below bottom side 201B of the embodiment. The shown right-hand fingering is being performed by a palm-up right hand supportably controlling the embodiment. To first utilize the device in an in-air mode, the device is lifted from whatever its temporary rest position may be on its bottom side 201B or its top side 201T, or upright on its rear side 201P. A right-handed user then situates the device in a right hand which has its palm P facing upward, so that the front side 201A of control shell 201 is forward and away from the user, the rear side 201P is toward the user, and control ball 202 is facing downward. The bottom side 201B of control shell 201 is then placed within the palm either directly forward or on a slight angle to the right so that as the ring finger R and little finger L naturally encircle the lower left side 201L of control shell 201 they may act together to squeeze control shell 201 into the palm P toward the ball of the lower thumb joint. This places middle finger M in a position where it may either rest just above key 203 on left side 201L, or be easily moved to actuate key 203. This also places thumb T in a position where it may either rest on right side 201R, or easily move over key 204, or move to a position over wheel 210 where it may effectively operate wheel 210. This also then places the index finger I under control ball 202 where finger I may then effectively operate ball 202. When actuated, control ball 202, wheel 210, and keys 203, 204 then send encoded signals through I/O cable 207, which exit control shell 201 through exit hole 208, and which signals are then sent through I/O cable 207 to a computer (not shown) where the signals are used to operate a standard or enhanced mouse-type control software application. Alternate means of circuitry and signal transmission for encoded signals from a multimodal device to a computer are further discussed in terms of the preferred embodiment of FIGS. 3–20.

In the horizontal in-air use position just described, the device may be used as a pointer device in any orientation in which the holding wrist may be tilted or twisted, and then set down again into a temporary rest position horizontally on bottom 201B or top 201T, or vertically on rear 201P. Due to the symmetrical positioning of keys 203, 204 and the middle positioning of control ball 202, which allows the device to be used equally effectively by either a left or right hand while in a horizontal position, as previously mentioned, the device cannot be effectively utilized when held upright by most hands because either control ball 202, wheel 210, or keys 203, 204 will be difficult to reach and effectively operate. While in-air horizontally, the device can also be used in a "stroker mode" where control ball 202 is allowed to frictionally engage a work surface such as work surface 209 to make long horizontal strokes, or short vertical or circular strokes. To use the in-air stroker mode, the user would place index finger I to the right side 201R of control shell 201 to allow control ball 202 to move without interference.

In addition to being used in-air, or in-air against a surface as just described, the device can be altered from its in-air grasp or its current temporary rest position and otherwise utilized in either a mouse or a trackball mode. In FIGS. 2E, 2F, the device is shown in use in a mouse mode. And in FIGS. 2G, 2H, the device is shown in use in a trackball mode.

The device may be used as a mouse whenever laid on bottom side 201B on a mouse pad or other work surface 209. FIG. 2E shows an overhead view of the embodiment of FIG. 2 in a horizontal position for use in a mouse mode by a palm-down right hand. FIG. 2F shows bottom side 201B of the embodiment of FIG. 2 with control ball 202 in use in a mouse mode. In the mouse mode of FIGS. 2E, 2F, control ball 202 rotatably, frictionally engages surface 209, and the lower-rearward edge of bottom 201B slidably engages surface 209. The device is shown held in an alternate grasp wherein index finger I and middle finger M rest toward the frontal portion of top side 201T, and thumb T is positioned on the left side 201L so that it may be used to operate function key 203 or wheel 210, and ring finger R is positioned on the right side 201R so that it may be used to operate function key 204, while little finger L rests right side 201R below ring finger R, while palm P braces the device from above near the rear portion of top side 201T.

Since keys 203, 204 operate as standard left and right mouse-like keys in their functions, which is appropriate for right-handed users, a user who is left-handed would utilize a left-right function key reverser switch 206 at the top 201T of control shell 201 to reciprocally exchange the keying functions of keys 203, 204 so that their respective sets of signals will be correctly interpreted by the operating system of the computer without stopping to perform this function through the standard mouse control software. In the trackball mode, a right-handed user will use switch 206 to reverse the functions of function keys 203, 204, since the device is itself reversed when the control ball 202 is facing upward as bottom side 201B faces upward. In the trackball mode, an encoder circuit reversal switch 205 is actuated. Switch 205 causes the two sensor encoder circuits (not shown) of control ball 202 to reverse their circuitry positions so that the rotational translation of control ball 202 will be reversed so that the separate encoder signal sets will be correctly interpreted by the operating system of the computer.

The device may be used in an upright trackball mode when laid on surface 201L, as shown in FIGS. 2G, 2H, so that control ball 202 faces upward from surface 209 and so that trackball support 211 rests against surface 209 causing control ball 202 to be suspended and free to rotate above surface 209. The device is then held in an alternate grasp wherein index finger I and/or middle finger M may be used to manipulate the upward-facing control ball 202, and thumb T is on left side 201L where it may rest or be used to operate function key 204, and ring finger R is on right side 201R where it may rest or may be used to operate function key 203, while little finger L rests on right side 201R below ring finger R.

The device of FIG. 2 would not be typically utilized within a surface or suspension base stand such as is shown for the preferred embodiment of FIG. 3 in terms of FIGS. 21, 23, 25 because of its inability to be utilized upright as the preferred embodiment may be used.

Although control ball 202 functions ideally in a middle-upper positioning within control shell 201, its functional placement may be somewhat altered without losing its multimodal capabilities. Or again, irrespective of the functional placement of the protruding control surfaces of control ball 202 from within control shell 201, that is, in a more upper or lower position than shown, or whether to the left or right side of control shell 201, and irrespective of the functional placement of the first or second function keys 203, 204 along the edges of control shell 201, whether higher or lower than shown in FIG. 2, the essence of the inventional structure remains the same. This is also true irrespective of which hand appendages (thumb and fingers) are utilized to operate control ball 202 or function keys 203, 204.

In its basic structural format, the multimodal device of FIGS. 2–2H is equivalent to the device that has been shown and described in terms of FIGS. 1–1H, in that it contains the basic components of the invention which are required to successfully operate a computer display screen pointer. The device of FIGS. 2–2H contains: a. a support housing control shell 201; b. a multi-axis pointer device, control ball 202; c. a minimum of two mouse-like function keys 203, 204; d. suitable sensors and circuitry to connect with the mouse application of a standard computer. All other components which were additionally placed into the structural context of the embodiment of FIGS. 2–2H are superfluous to the operation of the device as a basic invention of a multimodal pointer device in which multiple modes may be utilized. The device of FIGS. 2–2H, absent of all the further components which were shown and described, would still successfully function as either an in-air mouse, or as a horizontal surface mouse, or as a stroking mouse.

Moreover, by levering the embodiment of FIGS. 2–2H horizontally over a thin object such as book, or on an angle over a levering object such as a pen, the device of FIGS. 2–2H could be utilized as a stationary trackball with no further support component added.

DESCRIPTION

FIGS. 3–20—Preferred Embodiment

A preferred embodiment of a multimodal pointer method according to the present invention is described below in terms of FIGS. 3–20. FIGS. 21–27 will be utilized to explain how the inter-cooperative use of suspension and base stands enhance the performance of the preferred embodiment of FIG. 3.

FIGS. 3–16 are approximately scale drawings that diagrammatically and schematically illustrate a preferred way in which the invention may be embodied as a basic structure which can be manually manipulated in a plurality of different modes to operate a standard or enhanced mouse control software application. Alternately, the multimodal device shown in FIGS. 3–16 may be smaller or larger sized than the scale drawings shown, or otherwise slightly altered to better accommodate larger or smaller hand grasps, or for various other manufacturing, operational, or esthetic reasons. There are also several alternate ways in which to incorporate pointer devices within the context of the initial structural configuration of the basic components set forth in FIGS. 3–16. The more preferred alternate embodiments of these different structural configurations of components will be later provided in FIGS. 28–37 for exemplification of the overall method of the invention.

Control Shell

FIG. 3 shows a pictorial perspective view of a typical structural configuration of a preferred embodiment of the invention with a control shell 301 containing a rotatable, multi-axis control ball encoder 302 exposed on three sides, a recessed scroll wheel within a larger wheel enclosure 328L, and a plurality of mouse-like function keys 307–315 incorporated into the front, sides and rear of the embodiment. The embodiment is also shown being held on-edge by the thumb and fingers of a right hand in a triangulated grasp. FIG. 3 is not a fully detailed drawing and omits several components in order to better present an initial view of the spatial relationship of the primary elements of the preferred embodiment in relation to the spatial positioning of the actuating thumb and fingers. These omitted elements are shown more properly in FIGS. 4–20.

Figure 4:
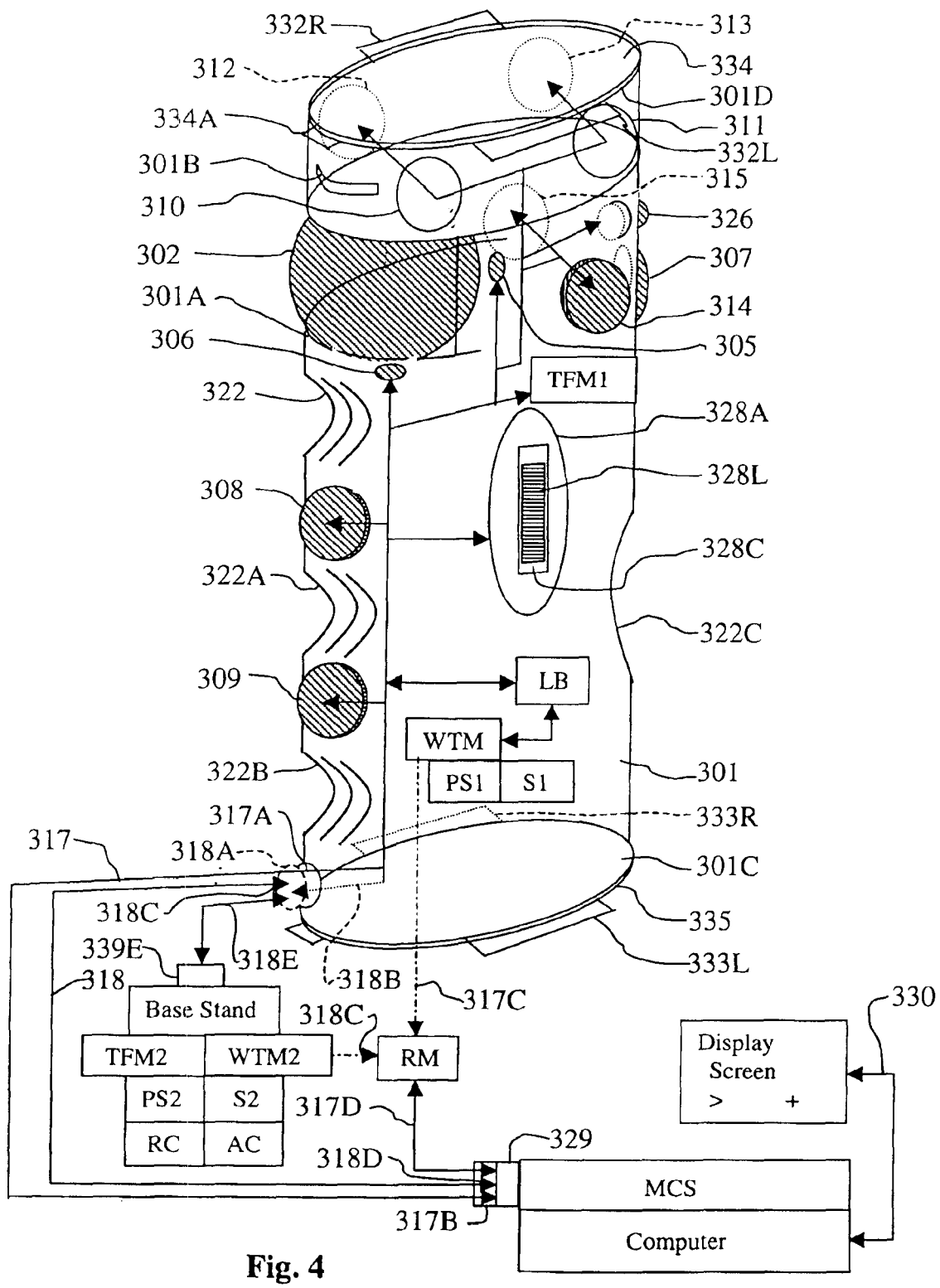
FIG. 4 shows a pictorial perspective and schematic view of the embodiment of FIG. 3.
Figure 5:
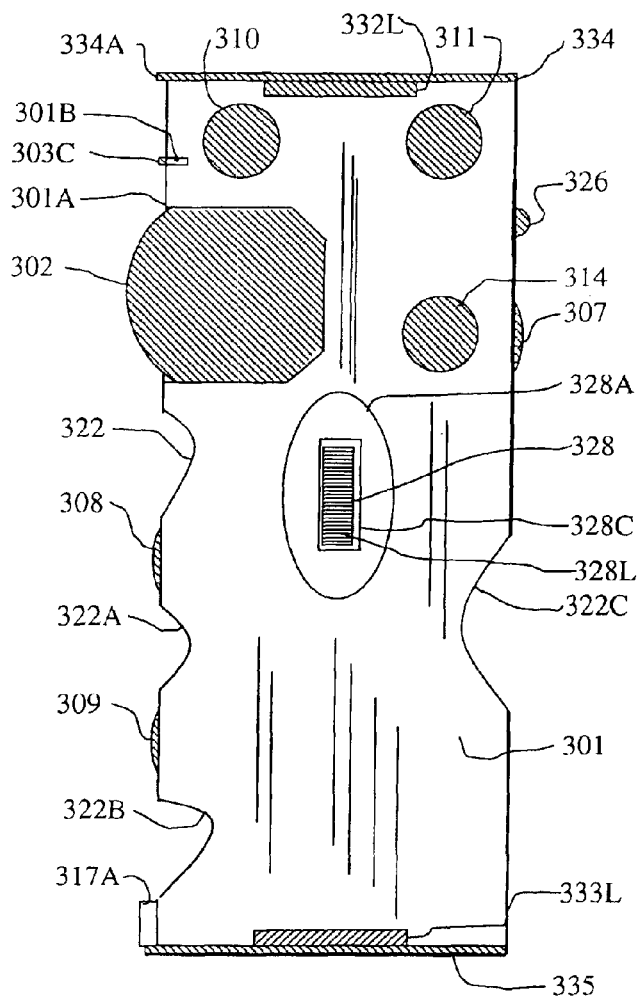
FIG. 5 shows a left side plan view of the device of FIG. 3.
Figure 6:
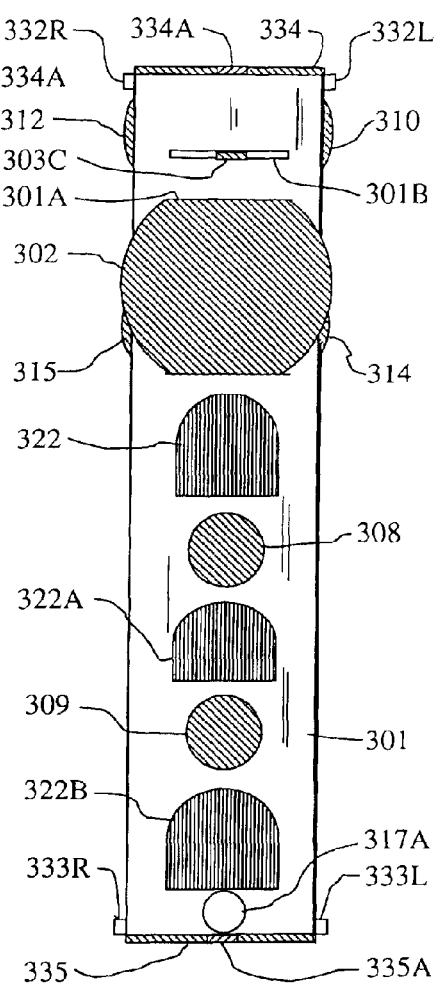
FIG. 6 shows a front plan view of the device of FIG. 3.
Figure 7:
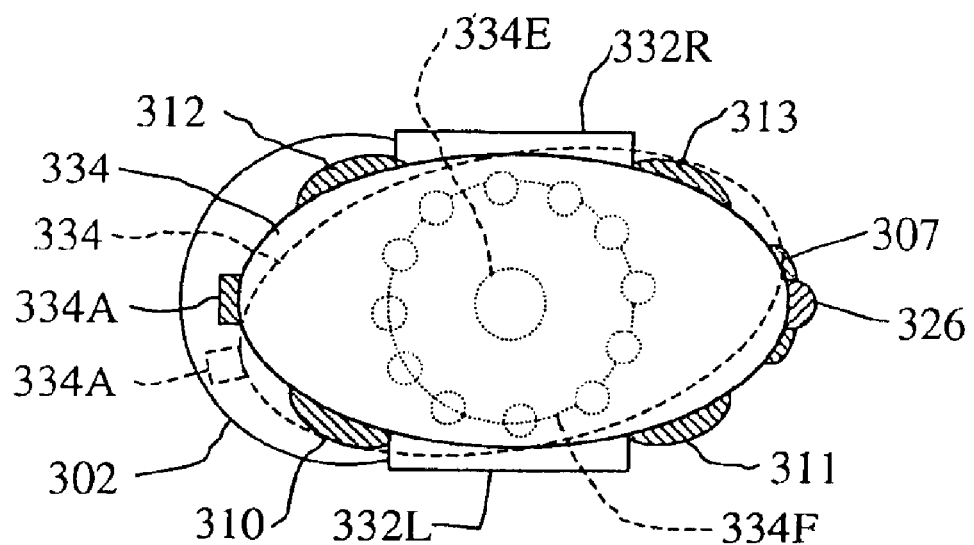
FIG. 7 shows a top plan view of the device of FIG. 3 further revealing the rotatable top mechanism in phantom and hidden lines.
Figure 8:
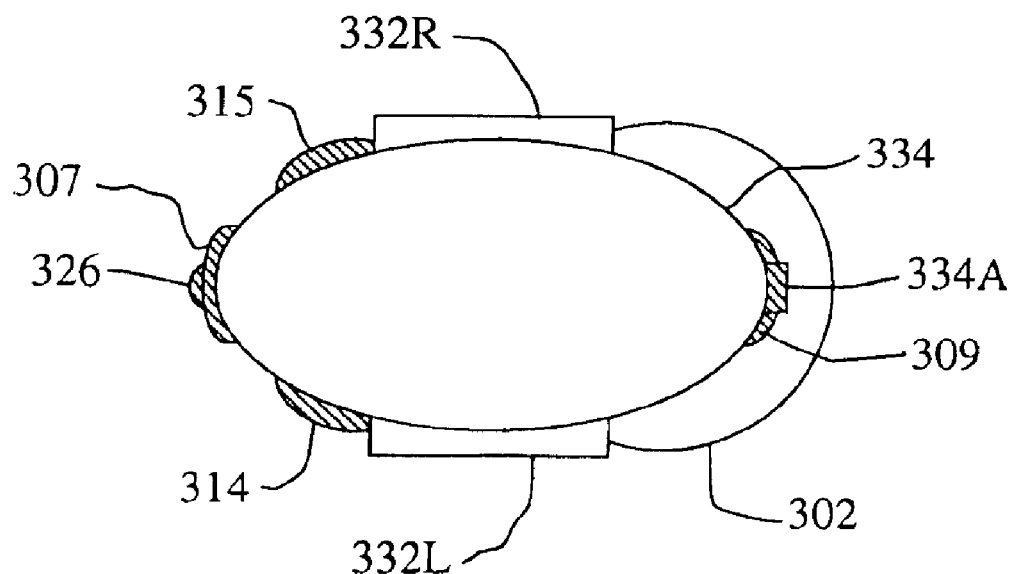
FIG. 8 shows a bottom plan view of the device of FIG. 3.
Figure 9:
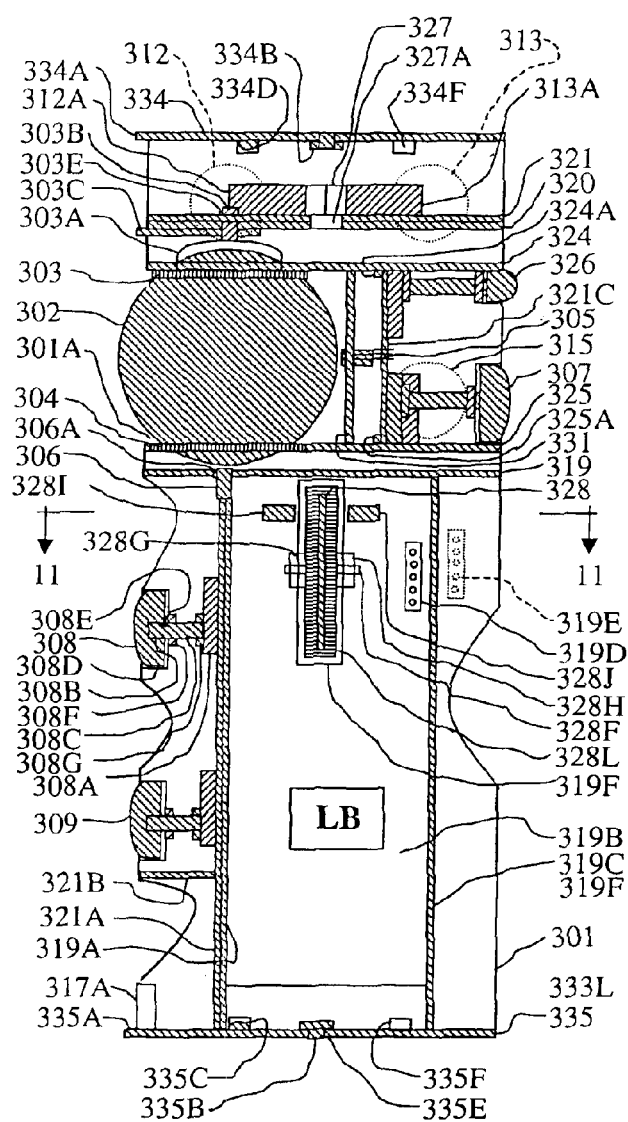
FIG. 9 shows a diagrammatic left-side cross-section view of the device of FIG. 3.
Figure 10:
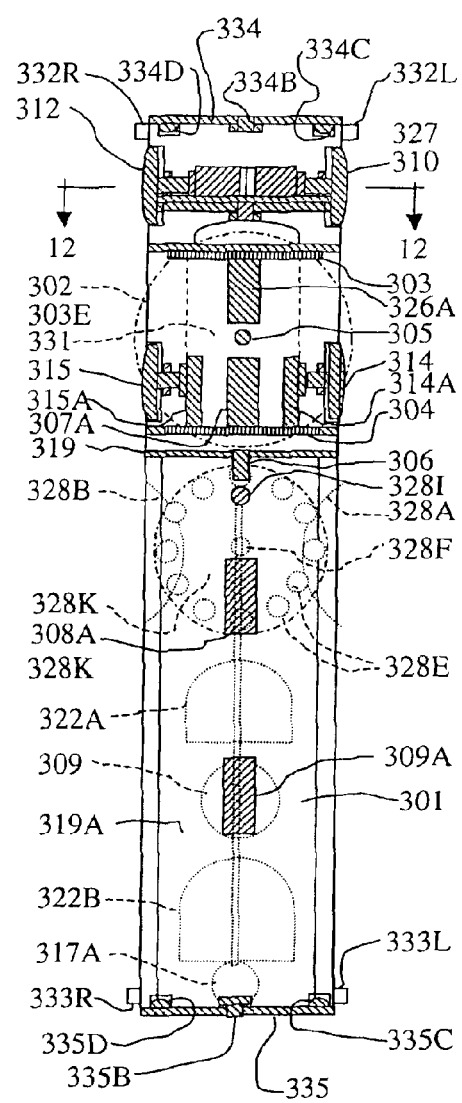
FIG. 10 shows a diagrammatic frontal cross-section view of the device of FIG. 3 with the control ball removed.
Figure 11:
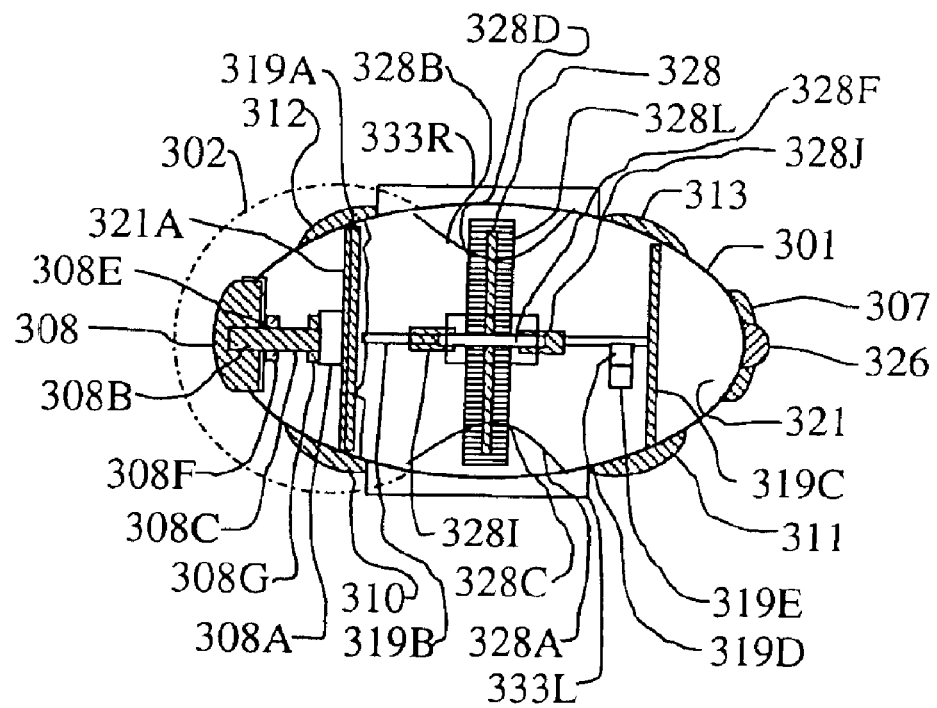
FIG. 11 shows a diagrammatic top-down cross-section view of FIG. 9, with a portion cutaway to reveal a function key mechanism.
Figure 12:
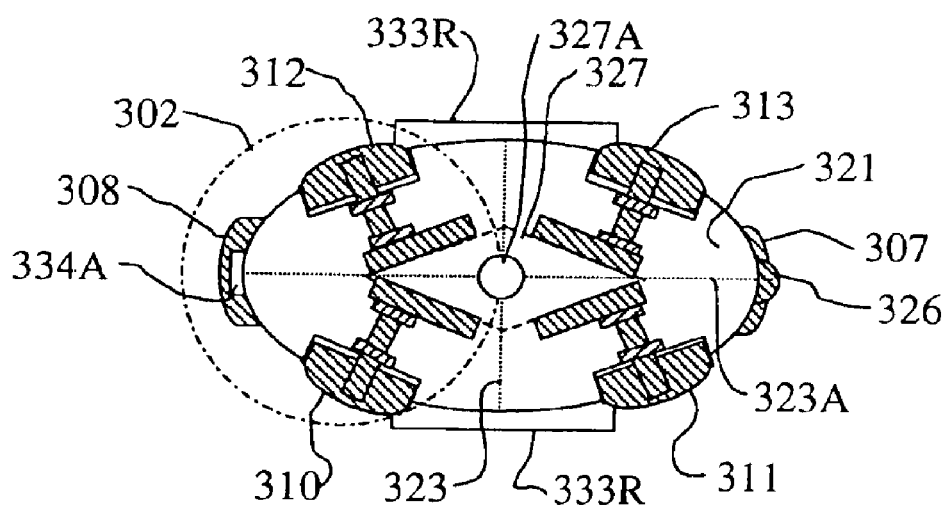
FIG. 12 shows a diagrammatic top-down cross-section view of the top of FIG. 10 revealing the quadrilateral arrangement of its upper function key switches.

FIG. 4 shows a pictorial perspective and schematic view of a structural and wiring configuration for the embodiment of FIG. 3. FIG. 5 shows a left side plan view of the device of FIG. 3. FIG. 6 shows a front plan view of the device of FIG. 3. FIG. 7 shows a top plan view of the device of FIG. 3 further revealing the rotatable top mechanism in hidden lines. FIG. 8 shows a bottom plan view of the device of FIG. 3. FIG. 9 shows a diagrammatic left-side cross-section view of the device of FIG. 3. FIG. 10 shows a diagrammatic frontal cross-section view of the device of FIG. 3 with control ball 302 removed and shown in phantom lines. FIG. 11 shows a diagrammatic top-down cross-section view of the device of FIG. 3, with a portion cutaway to reveal a function key mechanism. FIG. 12 shows a diagrammatic top-down view of the top of the device of FIG. 3 revealing the quadrilateral arrangement of its upper function key switches.

Figure 13:
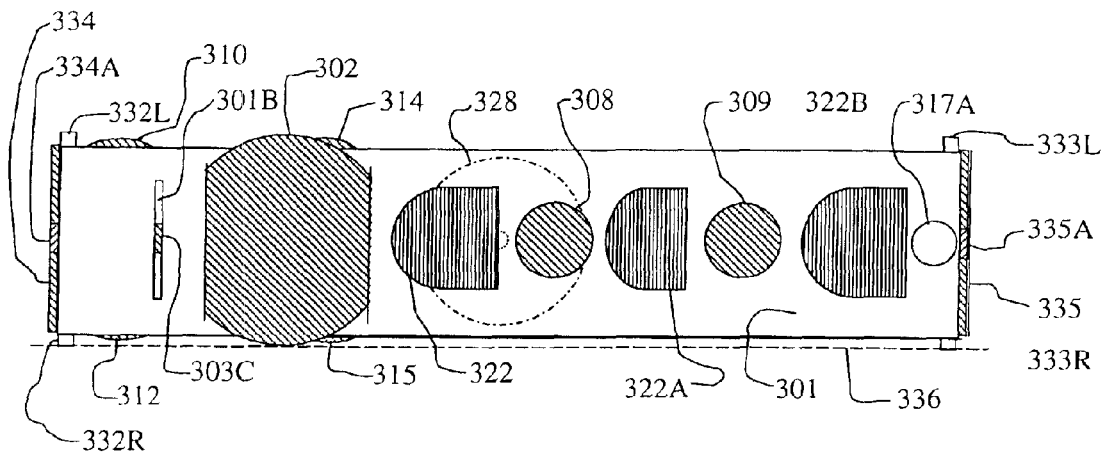
FIG. 13 shows a diagrammatic, front-horizontal view of the device of FIG. 3 as it is being deployed on a surface in a right-handed, standard mouse modality.
Figure 14:
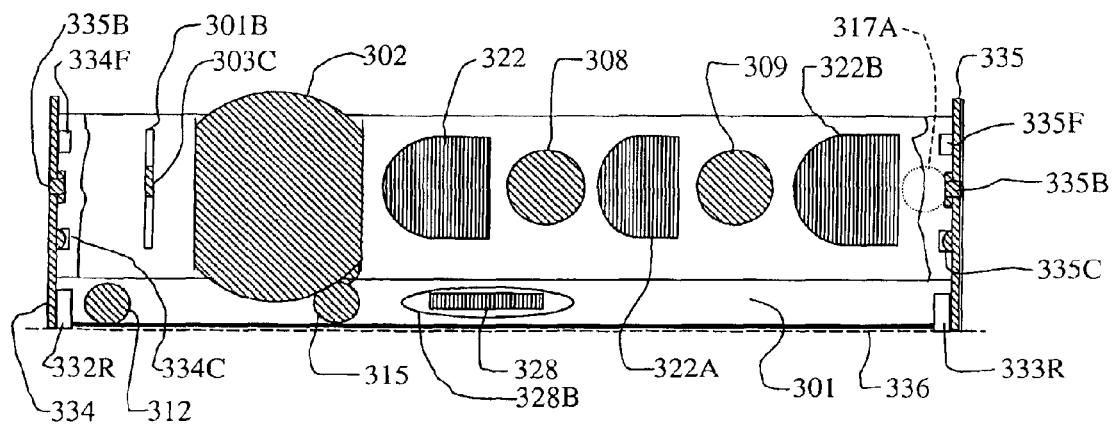
FIG. 14 shows a diagrammatic, front-horizontal and tilted view of the device of FIG. 3 as it is being deployed in a right-handed trackball modality, and also shows the structure of the top and bottom rotatable supports in cutaway cross sectional views.
Figure 15:
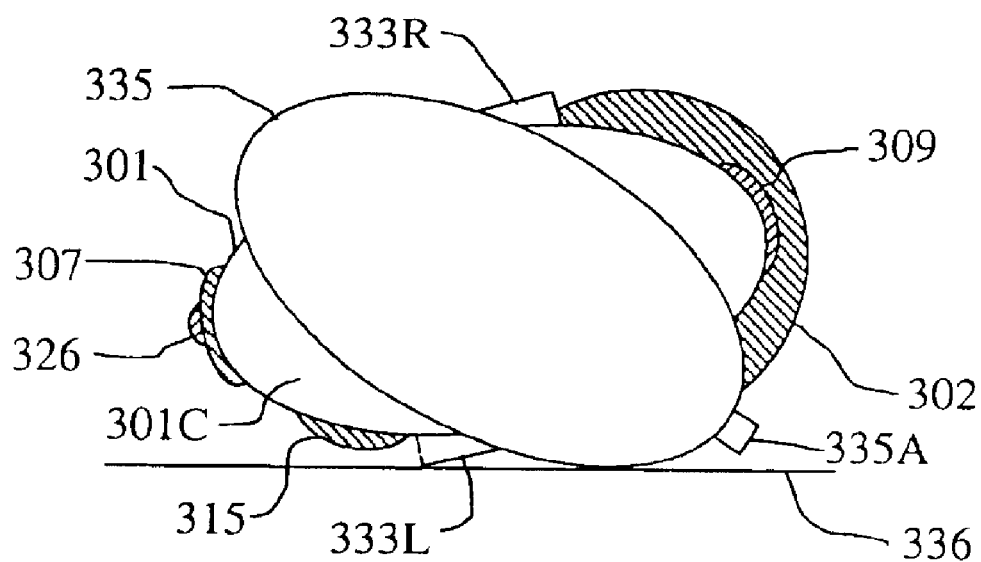
FIG. 15 shows a diagrammatic, bottom-horizontal and tilted side view of the device of FIG. 3 deployed in a left-handed trackball modality, and also shows its bottom rotatable support rotated into an angular position.
Figure 16:
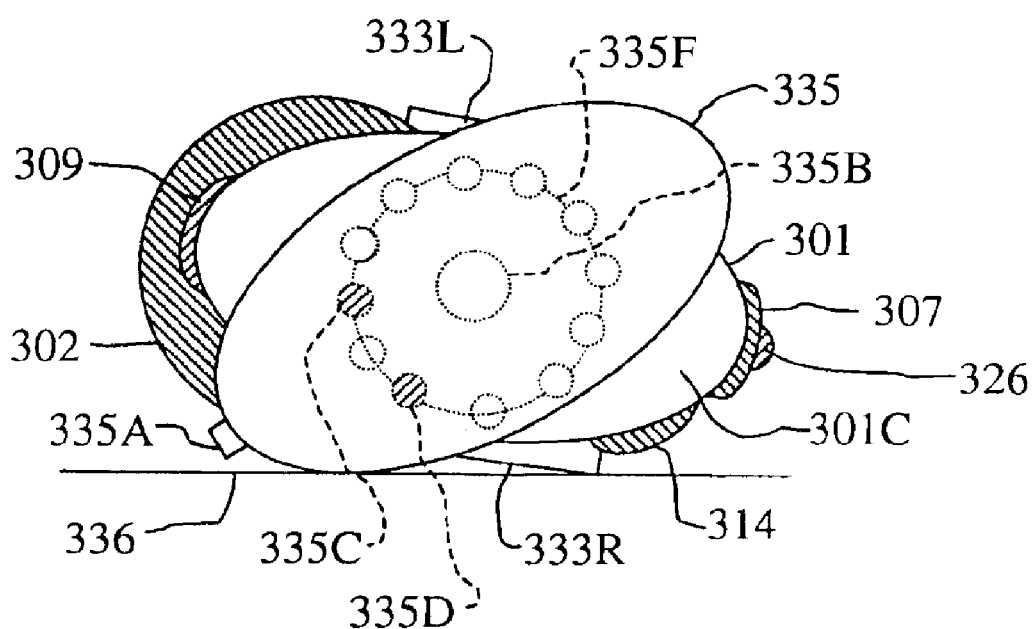
FIG. 16 shows a diagrammatic, bottom-horizontal and tilted view of the device of FIG. 3 deployed in a right-handed trackball modality, and also shows the inner structure of the bottom rotatable support in hidden lines.
Figure 17:
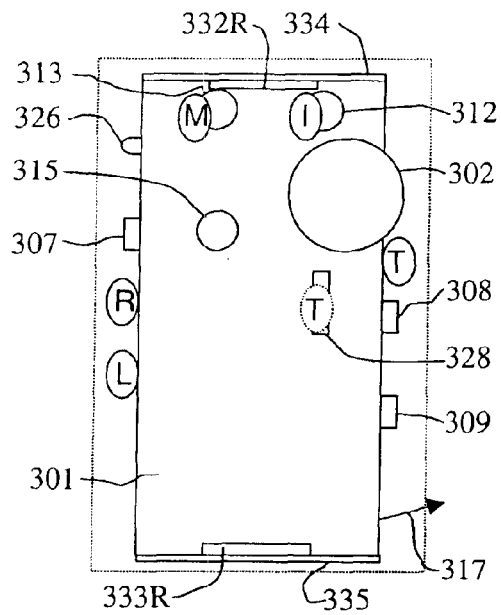
FIG. 17 shows a diagrammatic, top-down view of the device of FIG. 3 being used in a left-handed mouse modality, and also shows suggested fingering positions.
Figure 18:
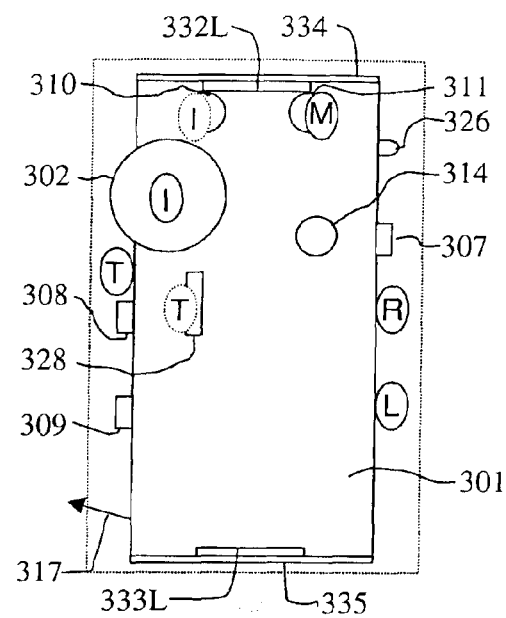
FIG. 18 shows a diagrammatic, top-down view of the device of FIG. 3 being used in a right-handed trackball modality, and also shows suggested fingering positions.
Figure 19:
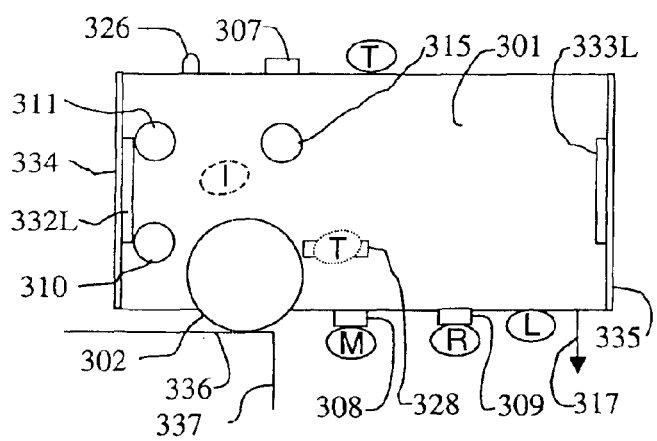
FIG. 19 shows a diagrammatic, left side view of the device of FIG. 3 being used in a right-handed stroker modality, and also shows suggested fingering positions.
Figure 20:
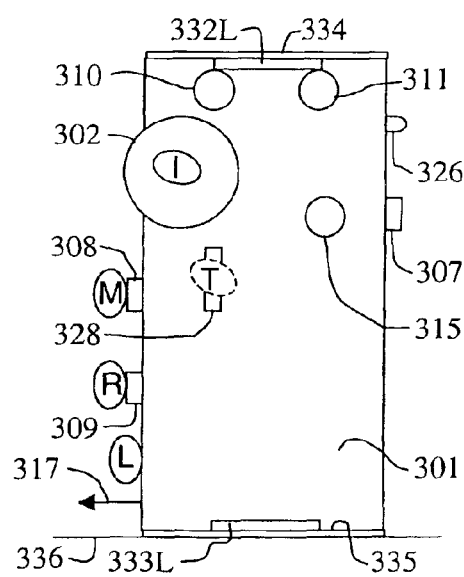
FIG. 20 shows a diagrammatic, left side view of the device of FIG. 3 being used in a left-handed in-air or on-base modality, and also shows suggested fingering positions.

FIG. 13 shows a diagrammatic, front-horizontal view of the device of FIG. 3 as it is being deployed on a surface in a right-handed, standard mouse modality. FIG. 14 shows a diagrammatic, front-horizontal and tilted view of the device of FIG. 3 as it is being deployed in a right-handed trackball modality. FIG. 15 shows a diagrammatic, bottom-horizontal and tilted side view of the device of FIG. 3 deployed in a left-handed trackball modality. FIG. 16 shows a diagrammatic, bottom-horizontal and tilted view of the device of FIG. 3 deployed in a right-handed trackball modality. FIG. 17 shows a diagrammatic, top-down view of the device of FIG. 3 being used in a left-handed mouse modality. FIG. 18 shows a diagrammatic, top-down view of the device of FIG. 3 being used in a right-handed trackball modality. FIG. 19 shows a diagrammatic, left side view of the device of FIG. 3 being used in a right-handed stroker modality. FIG. 20 shows a diagrammatic, left side view of the device of FIG. 3 being used in a left-handed in-air or on-base modality.

The basic invention in its preferred embodiment as shown in FIGS. 3–20, and more particularly in terms of FIGS. 9–12 consists of:

a. an elongated, hollow, elliptical cylinder, control shell 301;

b. a rotatable, multi-axis encoder, control ball 302 with encoded grid lines encompassing its surface area and representatively shown as hatch lines;

c. a ball cage consisting of two retaining ring collars, an upper ring collar 303, and a lower ring collar 304, with control ball 302 protrudingly exposed on three sides (front, left and right) through a partial ellipsoid, upper-frontal opening in control shell 301;

d. two perpendicular, optical encoding sensors, a rear optical sensor 305, and a lower optical sensor 306, such as are conventional in the art for the translation of the rotational motion of a grid-lined control ball into digitally encoded pointer signals;

e. nine function keys for performing basic mouse-type functions, or various mouse function assignments being:

1. an upper rear edge function key 307, and
2. an upper front function key 308,
3. a lower front function key 309, approximately vertically aligned with upper function key 308 and control ball 302, and
4., 5. two upper left side function keys, a front upper left function key 310, and a rear upper left function key 311, and
6., 7. two upper right side function keys, a front upper right side function key 312, and a rear upper right side function key 313, with both sets of side keys 310–313 approximately horizontally aligned with control ball 302 and at an approximate right angle to front keys 308, 309; and
8., 9. two lower-rear-side function keys, a left lower-rear-side function key 314, and a right lower-rear-side function key 315.

f. suitable mechanical connections (described more fully below), respectively, between the nine function keys and a set of nine suitably sized, standard mouse miniswitches 307A, 308A, 309A, 310A, 311A, 312A, 313A, 314A, 315A;

g. a standard mouse logic board, represented in FIG. 3 by a boxed-in "LB";

h. the addition of a tactile feedback (force-felt) module, such as a tactile feedback module represented in FIG. 3 by a boxed-in "TFM1," as will be explained more fully below.

i. various I/O cable and wireless connections, explained more fully below in terms of FIG. 4, which are connective with a standard or enhanced mouse control software application, represented in FIG. 4 by a boxed-in "MCS," within a computer, represented in FIG. 4 by a boxed-in "Computer," with a display screen, represented in FIG. 4 by a boxed-in "Display Screen," which has a pointer arrow icon, represented FIG. 4 by a ">" boxed-in with the display screen, and a cursor icon "+" boxed-in with the display screen.

Control shell 301 may be operated apart from or while physically and electronically connective with an intercooperative suspension or surface base stand, represented in FIG. 4 by a boxed-in "Base Stand," as explained more fully below in terms of FIGS. 21, 23, 25.

FIG. 3 also shows a diagrammatic view of the invention being held in a triangulated grasp by the thumb and fingers of a right hand 316, shown in dash-dot-dot phantom lines to avoid being confused with the drawing elements. In FIGS. 3, 17–20, the preferred embodiment is shown as right or left hand operated devices with suggested right and left handed fingering positions shown. A mirror image set of the devices and fingering positions shown would apply for an opposite handed operation. In FIGS. 3, 17–20, left and right-handed fingering positions are represented by the letters and equivalents which follow: a "T" is a thumb; an "I" is an index finger; an "M" is a middle finger; an "R" is a ring finger; and an "L" is a little finger, each of which letter symbols has been respectively placed within an enclosing oval. A regular-line enclosing oval represents a primary fingering position, and a dotted-line enclosing oval represents an alternate fingering position.

In terms of FIGS. 3, 4, in one basic use modality, a user grasps control shell 301 on edge with a right hand 316, either while control shell 301 is separated or connective with a Base Stand. The user then typically utilizes a middle finger M or a ring finger R, or a ring finger R and a little finger L to operate upper front function key 308, and lower front function key 309, and uses a thumb T to operate upper rear edge function key 307, while using an index finger I, or thumb T, or both thumb T and index finger I together, to omnidirectionally rotate control ball 302. These manual manipulations then connectively and cooperatively cause miniswitches 307A–309A and encoding sensors 305, 306 to pass digitally encoded data through an I/O cable 317 to logic board LB, and from there either directly by I/O cable 317, or indirectly by a wireless transmitter module, represented in FIG. 4 by a boxed-in "WTM", or by intermediate wired or wireless means (explained more fully below) to the mouse control software MCS in a Computer which both moves pointer icon > on the display screen and controls cursor icon + and other mouse functions.

The stable grasping method shown in FIG. 3 is preferable when the device is to be used in a typically upright and stable in-air operating mode position. When used in different modalities, as a surface-contact mouse, or as a trackball, or in other possible modes, different hand grips and different function keys utilized will apply, as will be explained below, and later through the use of FIGS. 13–20. When the device is used in-air, the stable grasping position just described may be maintained while the device is tilted in any orientation from vertical.

Referring to FIGS. 3–12, the preferred embodiment of the invention typically consists of a hollow support housing, control shell 301, typically made of plastic such as injection molded ABS plastic, or other suitable material. Control shell 301 is typically made in form-fitting, approximately symmetrical halves (not shown) which are attachably detachable from each other either via pressure fitting, snap-in connections (not shown), or via screws which pass through provided holes in one of the sides which connect with screw mounts formed in the material in an opposing side of the one of the halves (not shown). The separation line and connections separating the two halves of control shell 301 have been omitted to avoid over-complicating the drawings. The separation line is irregular and may be cut in a variety of ways since the various cross supports of control shell 301 (explained below) may be situated in a variety of ways, and since certain components of the device are either molded or otherwise built-into the support half of the housing shell and will protrude into the irregular line of the cover half of the housing shell, as will be explained more clearly below.

The device is made so that control ball 302 and its ball cage (explained below), and all logic circuit boards and circuitry remain in the designated support half of control shell 301, typically the right half, as shown in FIGS. 9–12. The opposing half of control shell 301 serves primarily as a cover and as a support for the circuitry and switchwork of any present function control keys on that side, or for components otherwise dependent upon both halves being together for support. The circuitry in the cover half of control shell 301 is then wired into a cover-half standard pin plug 319E and pin-plugged into a support-half standard pin plug 319D which is itself wired into logic board LB. This is done prior to connecting the two symmetrical halves of control shell 301 together by the aforementioned pressure fittings or screws and mounts. When so assembled, control shell 301 is a support housing in the shape of an elongated, elliptical cylinder wherein the top and bottom elliptical shapes typically have a major axis 323A to a minor axis 323 ratio of approximately 2:1.

Although a rectangular parallelepiped housing such as was utilized in FIGS. 1–2H may be utilized to make the device, a rounded-rectangular parallelepiped housing or an elliptical cylinder shape or other shape may be utilized. An elliptical cylinder shape for control shell 301 is preferable because it provides a more natural grasp for a hand. Control shell 301 is typically, approximately sized to be 15.24 cm (6") in height by approximately 5.84 cm (2.3") depth by approximately 3 cm (1.2") in greatest width. Control shell 301 typically narrows to approximately 12.7 mm (0.5") in its frontal region where function keys 308, 309 are located, and also typically narrows to this width where it is rounded in its rear portion, as shown more clearly in FIGS. 7–8, 11–12. For reference, a standard horizontal mouse is approximately sized to be 12.2 cm (4.8") in length, 6.35 cm (2.5") in width, and 3.81 cm (1.5") in height.

Control Ball

As variously shown in FIGS. 3–20, control ball 302 is preferably a spherical, polymeric or cast phenolic resin control ball, typically approximately sized at 3.56 cm (1.4"), and typically of the type that has surface grid lines which cooperate with two perpendicular, optical encoding sensors, a rear optical sensor 305, and a lower optical sensor 306, such as are conventional in the art for the translation of the rotational motion of a grid-lined control ball into digitally encoded pointer signals suitable for use with a standard or enhanced mouse control application.

Alternately, control ball 302 may be any type of control ball such as is conventional in the art for the translation of the rotational motion into analog or digital signals which are suitable for use with a standard or enhanced mouse control application, that is, any control ball which is a multi-axis pointing position control device which minimally permits continuous rotation about an X-axis to provide generation of a first motion signal, and a continuous rotation about a Y-axis to provide generation of a second motion signal to enable directional control of a pointing icon > and a cursor icon + on a Computer Display Screen, as shown in FIG. 4. Alternately, sensors 305, 306 would then be correspondingly appropriate for suitable use with such an alternate form of control ball 302, and thus be, for example, in the form of Light Emitting Diodes or LEDs with standard photo-responsive light receivers in the form of photodiodes, or Hall effect sensors suitable for sensing magnetic flux variations caused by the bumps on, or holes in the inner core of a rotating alternate form of control ball 302, or other similarly effective conventional means.

Referring primarily to FIGS. 9, 10, at the upper-front edge of control shell 301, control ball 302 is rotatably sandwiched within a ball cage formed between an upper retaining ring collar 303, and a lower retaining ring collar 304. Ball cage collars 303, 304 allow control ball 302 to be easily rotated in any direction, and allow control ball 302 to be protrudingly exposed through the cage to the front and both sides through a partial ellipsoid, upper-frontal opening 301A in control shell 301. The ball cage formed by upper collar 303 and lower collar 304 maintain control ball 302 in continuous optical, magnetic Hall Effect, or frictional engagement, or other signal generating connectiveness with the sensor encoders being utilized in the embodiment, regardless of elevational angle, so that pointer icon > may be reliably controlled with control ball 302 omnidirectionally rotated into any position.

Collars 303, 304 may be solid or patterned rings made of a suitable slippery material such as Teflon or other slick material, or may be typical ball bearing rings or other forms of bearing rings. Upper collar 303 is connectively attached by a circumferential pressure fit within the underside of a suitably sized, circular-partial sphere, upper ring collar holder 303A, or if upper collar 303 is a solid ring collar it may be formed from the same material as ring collar holder 303A. Holder 303A is connected at its upper portion to a screw bolt 303B, which is connected at a right angle with an extended lever 303C which passes frontally through and extends outside of control shell 301 through horizontal slot 301B.

When finger-actuated, lever 303C turns screw bolt 303B within a screw hole 303D (filled by bolt 303B) in an upper horizontal support brace 320 and thence through a hole 303E in an upper horizontal circuit board 321 to tighten or loosen upper collar 303's pressure against control ball 302. Collar holder 303A, bolt 303B and lever 303C are typically formed together as a single piece molded from plastic, or other suitable material, which is utilized operationally as a single unit whose function is to bear down on control ball 302 and form the upper portion of the control ball cage, and to enable a user to adjust the rotational, frictional tension of control ball 302 to a preferential setting. When the cover half of control shell 301 is removed and lever 303C turned to a rearward position, ball 302 may be removed for maintenance if required.

Function Keys, Switches, Boards and Supports

The preferred embodiment of FIG. 3 has two basic function keys which may be utilized in all of its modes if programmed to do so, being an upper-front-edge function key 308, and an upper-rear-edge function key 307. The embodiment of FIG. 3 also has seven additional function keys which allow the multiple modes of the multimodal pointer device to be utilized in varying ways according to the preferences of the user. The seven additional function keys are: a. a lower-front-edge function key 309; b. two upper-left-side function keys, a front-upper-left function key 310, and a rear-upper-left function key 311; c. two upper-right-side function keys, a front upper-right-side function key 312, and a rear-upper-right side function key 313; d. two lower-rear-side function keys, a left lower-rear-side function key 314, and a right lower-rear-side function key 315. The set of front upper and lower function keys 308, 309 are approximately vertically aligned with control ball 302, and both sets of side keys 310, 311 and 312, 313 are approximately horizontally aligned with control ball 302, and at an approximate right angle to front keys 308, 309. Control shell 301 has four provided recessed finger rest areas, upper front recessed area 322, middle front recessed area 322A, lower front recessed area 322B, and rear recessed area 322C, which are molded into the material of control shell 301 to enable further support and orientational control over the mass of the device.

Function keys 307–315 are typically made of plastic or other suitable material, and are typically circular shaped with a shallow dome. Alternately, function keys 307–315 may be recessed, protruding, or flush with the control surface, and be of virtually any shape or size that does not exceed the height of the protrusion distance of control ball 302 to the sides of control shell 301. Alternately, the respective function keys 307–315 may each actuate a different form of switch than the standard form of miniswitch shown and described.

As exemplified by upper frontal function key 308 in FIGS. 9, 11 each function key 307–315 is respectively in a caged setting. As in the example of key 308 in FIGS. 9, 11 each key, respectively, has: a. a centered push-on key hole 307B–315B in its bottom portion, shown filled, respectively, by a set of push stems 307C–315C onto which, respectively, each key hole 307B–315B attachably detachably slides in a pressure fit respectively onto stems 307C–315C; b. a suitably sized, recessed, set of circular key slide holes 307D–315D molded within the surface material of control shell 301 in which keys 307–315 are respectively deployed.

Push stems 307C–315C are held in place by a set of circular stem guide holes 307E–315E, which have been, respectively, molded into the thickened surface material of control shell 301 at the bottom of key slide holes 307D–315D.

Element numbers and lines were omitted from FIGS. 9–12 for all function keys except the example key 308 to avoid over-complicating the drawing with redundant features, since each of the other function keys are identical in material and structure, except for key 326 which has a slight smaller key button, and several of the keys which have slightly longer or shorter push stems. Thicker housing support lines for control shell 301 were omitted from the drawing to lessen any possible confusion in differentiating different parts from one another.

Typically, each push stem 307C–315C is, respectively, a mold-formed plastic piece with an inner washer, being a set of washers 307F–315F to prevent outsliding, and a contact endpiece, being set of contact endpieces 307G–315G, which respectively push against the respective miniswitch actuation keys of a set of miniswitches, being miniswitches 307A–315A, when keys 307–315 are depressed into slide holes 307D–315D and urge push stems 307C–315C against miniswitches 307A–315A. Keys 307–315 then utilize the respective miniswitch's spring return to remain in an upwardly accessible position after each clicking operation. Function keys 307–315 are respectively pushed onto stems 307C–315C in a clasping pressure fit within holes 307B–315B (hidden by stems 307C–315C) during manufacture, and then not typically removed.

Upper and lower frontal miniswitches 308A, 309A are suitably affixed to a lower front vertical circuit board 321A, which is itself suitably supportably attached to the front portion 319A of an H-shaped lower support plate structure which is molded into the support-half material of control shell 301. Vertical board 321A also has a lower frontal brace piece 321B, also molded into the support half material of control shell 301. Referring to FIGS. 11, 12, vertical circuit board 321A is parallel to minor elliptical axis 323 and perpendicular to major elliptical axis 323A, and rests between an upper brace section 319 of the H-shaped lower support plate structure and the bottom material 301C of control shell 301. Upper brace section 319 is also itself molded into the right support half of control shell 301 along with the remaining H-shaped lower support plate structure.

The H-shaped lower support plate structure has lower horizontal cross member support plate 319 as its top piece and the lower material bottom 301C of control shell 301 as its bottom piece. The lower support plate structure then has four sections: upper brace section 319, a front section 321A against which board 321A is attached; a middle section 319B against which circuit logic board LB (along with all of its electronic processing components) is suitably supportably attached, along with a single-axis wheel encoder 328 and its operating and support components, as will be explained below; and, a rear section 319C which serves along with front section 319A to keep middle section 319B supported at the correct distance between the left and right cover walls of control shell 301, so that wheel 328 may properly operate within middle section wheel hole 319F and within its recessed control shell openings 328A, 328B, as will be explained below.

The circuitry in the cover half of control shell 301 is wired into a cover-half standard pin plug 319D and pin-plugged into a support-half standard pin plug 319E which is itself wired into logic board LB. This is done prior to connecting the two symmetrical halves of control shell 301 together by the aforementioned pressure fittings or screws and mounts.

Lower ball encoding sensor 306 is also located in a suitably supportive position on the upper middle end of front vertical circuit board 321A in a mid-positional cutaway support area which is also within a cutaway area in front brace section 319A. Encoding sensor 306 passes through an access hole 306A in a lower ball cross-member support plate 325 at its perpendicular intersection with vertical circuit board 321A. Lower ball cross-member support plate 325 is also itself molded into the right support half of control shell 301.

Upper rear function key 305 and lower-rear-side miniswitches 314A, 315A for keys 314, 315, along with a reverser miniswitch 326A (explained below), are suitably affixed to an upper-rear-side vertical circuit board 321C, which is itself suitably supportably attached to two cross clasps, an upper cross-clasp 324A, molded into the underside of an upper ball-cross-support plate 324 and a lower cross-clasp 325A, molded into the top side of a lower-ball-cross-support-plate 325. Encoder 305 also passes through and is supported by a suitably sized hole 331A (filled by encoding sensor 305) in rear ball-vertical support plate 331. Vertical support plate 331 is also molded into the support half of control shell 301 and serves to additionally support upper plate 324 and lower plate 325.

As shown in FIGS. 9, 10, 12, upper function key miniswitches 310A–313A are arranged along and suitably supportably affixed to the four sides of a hollow, diamond-shaped, plastic mounting block 327 which is suitably connective with and raised upon upper horizontal circuit board 321 just above cross member support plate 320. Mounting block 327 has a centered hole 327A for I/O cable 317 to access which passes through board 321 and plate 320. As just explained, each upper side function key 310–313 has circular push-on key face which fits into angled, circular recessed slide holes molded into the upper portion of control shell 301 on both sides of both halves of shell 301.

Mouse-like function assignments for keys 307–315, in terms of standard mouse terminology, and in terms of a standard or enhanced mouse driver software application, as used for a right or left hand are typically as follows. Either one of front keys 308 or 309, and rear key 307 may be, respectively, left and right function keys, with the unused front key 308 or 309 remaining programmable, for example as an auxiliary key with an action of a click, double-click, or click-and-drag. Or, if it is not desired that rear function key 307 be programmed to function as a primary or secondary mouse function, as would a typical left or right function key on a standard mouse, both frontal keys 308, 309 may serve as the primary and secondary key (as chosen) and rear key 307 may serve as a programmable key. Since typical edge-on use of the multimodal pointer device does not interfere with the sets of upper side keys, function key assignments for the upper side-sets of keys, 310, 311 and 312, 313 are typically configured for left or right handed users in an "On" status as either left-right or right-left keys, dependent on the handedness of the user, with these sets of function keys being optionally utilized after mode changes to a horizontal positioning for movable mouse or stationary trackball use, as will be explained more properly below.

In the circumstances detailed above, encoder-sensors circuit reverser key 326 would then be utilized when required to transpose the signals from sensors 305, 306. As just suggested above, the left-right mouse-like functions of the respective function keys sets is typically initially performed through the mouse control software MCS of the Computer and generally remains without change for the same handedness of a single user. Since handedness, right or left, is normal for most users, of the nine function keys provided in the embodiment of FIGS. 3–20, several will go unused under normal circumstances of hand use preference. Thus, alternately, in lieu of a standard mouse driver, an enhanced mouse driver application would be utilized to enable these unused function keys to be utilized as programmable keys for various tasks such as to select and alter the axis assignment, XYZ, etc., for any added-in single-axis wheel encoder, such as a wheel encoder 328, or to add other control features such as zoom controls, or single-key double-click controls, or drag operation controls, or an autoscroll function. Alternately, a second reverser switch may be provided for the preferred embodiment as was provided for the basic embodiments of FIGS. 1–2H. The second reverser switch would switch designated sets of function keys in the plurality of keys from left-right to right-left and back.

Circuit reverser key 326 is designed in essentially the same manner and utilizes the same operational method as function keys 307–315, in that it is a small, plastic, domed reverser function key 326 which utilizes an equivalent miniswitch 326A. In terms of the example of function key 308 in FIGS. 9, 11, reverse key 326 has a bottom-centered, push-on key hole 326B, which hole is pressure fitted onto a molded plastic push stem 326C. Key 326 slides within a recessed, circular slide hole 326D. Stem 326C slides within circular stem guide hole 326E, and stem 326C consists of an inner washer 326F to prevent outsliding, and a contact endpiece 326G for pushing against the actuation key of miniswitch 326A when key 326 is depressed into slide hole 326D to urge stem 326C against miniswitch 326A. Reverser key 326 also utilizes miniswitch 326A's spring return to remain in an upwardly accessible position after each clicking operation. Circuitry for the respective miniswitches 307A–315A, 326A is discussed more properly below.

Alternately, function keys 307–315 may also be done in various, generally U or C-shaped, wraparound formats wherein the switch cover may extend around the frontal or rear edges of control shell 301 and miniswitches 307A–315A be actuated from either side of the sharply curved front or rear of control shell 301 by lateral squeezing pressure against the curved sides of the device. Such switch covers would utilize the further swivel action of a cam, or levers or other such similar effect-producing, intermediate mechanical actions. Such devices were omitted from the specification because they have proven to be more apt to fail then simple independent switch covers as have been shown and described in terms of function keys 307–315. Experiments have shown that an extended, curved, key face which levers a centered, frontally-facing, on-off miniswitch key such as key 308 by cam or other action, serves no useful purpose since the actual direction of force applied by the tip, first section, or second section of a finger such as middle or ring fingers M, R is generally inward toward the miniswitch, irrespective of hand size and consistent with the choice of the user. Also, the method of the invention in terms of grasping and actuating the function keys of a multimodal pointer device does not require the larger-sized function keys typical of a standard mouse.

Many of the early models of the preferred embodiment of the multimodal device described above in terms of FIGS. 3–20 were provided with various types of rear-mounted internal and external, longitudinally extended and variously curved "grip modifier" schemes to better accommodate all hand sizes. The mock models began small for a child's hand, and as the grip extender traveled further out, increased to average, and then beyond for larger hand sizes. These were subsequently dismissed as unnecessary when the forward function keys were designed in their current format. It was clear that, in the current format, the same effect that a grip extender would provide was naturally achieved by two factors: a. the natural wrapping action of the operating fingers around the front function keys 308, 309 and around control ball 302 enabling the actuation of the keys and ball either by the user's fingertips (for smaller hands), or further along in the wrapping process, by the underside of the first section of the actuating fingers (for average sized hands), and ending in the actuation of the keys by the undersides of the second section of the fingers (for larger hand sizes); b. the natural tendency when using the device in an edge-on grip is to tilt the device forward and/or sideward, which then moves the palm line further downwards from the ball and keys and so allows virtually any size hand to be accommodated.

Alternately, because of the larger surface area of control shell 301 relative to a standard palm-down mouse, control shell 301 could house other programmable keys (not shown) which would be described and operated in the same way as keys 307–315, and would be used for alternate programmable mouse functions.

Alternately, the precise placement of the various function keys and switches shown and described could be otherwise positioned or wired, and otherwise affixed to other positions and surfaces of the device, so long as the various function keys remain within the reach of a controlling finger during use of the device in its various use modes.

Single-axis Wheel

A single-axis encoding wheel 328 is variously shown in partial view in the majority of FIGS. 3–20. Referring to FIGS. 9–11, single-axis encoding wheel 328 is typically mounted within a cutaway area of a lower-brace-structure middle section 319B and a cutaway area of circuit logic board LB (which extends across section 319B). Logic board LB is itself suitably supportably attached to lower-brace-structure middle section 319B.

Wheel 328 is positioned along or adjacent to a line connecting the intersection points of the minor and major axises 323, 323A of the top 301D and bottom 301C of control shell 301, and is typically parallel to the minor axis 323 and perpendicular to the major axis 323A. Wheel 328 is typically made of lesser diameter than the maximum width of control shell 301's minor axis 323, and is contained within a left recessed opening 328A, and a right recessed opening 328B formed into the surface material of the opposing support and cover halves of control shell 301. Recessed openings 328A, 328B are typically ellipsoid with their major axises aligned with the center of wheel 328, and, respectively, have a molded-in left wheel slot 328C and a right wheel slot 328D which allows wheel 328 to protrude into openings 328A, 328B for access by a thumb or other digit.

Wheel 328 is typically a standard optical encoder wheel with slits or voids or other indicia 328E which serves to provide digital interruptions between a light source and a photoreceiver. Wheel 328 is rotatable on an axle 328F which is mounted on a left axle support 328G, and a right axle support 328H which are a formed part of lower-brace-structure middle section 319B and which protrude through a cutaway portion of circuit logic board LB as a continuation of a middle brace wheel hole 319F to the left and right of the rotational axis of wheel 328.

Wheel 328 typically rotates between a standard light source in the form of Light Emitting Diode or LED 328I and a standard photo-responsive, light receiver in the form of photodiode 328J, both also being suitably supportably mounted on circuit logic board LB. However, other alternate encoding methods may be utilized in lieu of the specific optical encoding method shown and described for FIGS. 3–20. That is, encoding wheel 328 may utilize various rotation to electrical signal transducers such as are conventional in the art, and which provide a distinction between wheel surface 328K and indicia 328E in a way which produces digital signals useful for a single-axis pointer control device.

Wheel 328 is typically formed of plastic or other suitable material along with axle 328F. Wheel 328 is also typically encased in a larger wheel enclosure 328L made of plastic, rubber, vinyl or other material which is suitable for rotation by a human finger, or wheel 328 is made in a fashion where it has a molded-in larger order, thicker outer rim, typically with a friction-inducing surface formed by depressions or protruding striations or other similar surface markings. The increased width of wheel enclosure 328L allows the manipulating digit to better reach and rotate the wheel 328, irrespective of its alignment with the digit. Alternately, wheel 328 may be made in a more barrel-like or spherical form, or be any equivalent roller. And alternately, wheel 328 may be of the type which includes a spring which is biased against a smaller roller, to produce a ratcheting movement of said roller to provide tactile user feedback, such as is conventional in the art.

Wheel 328 is typically utilized as a scroll wheel which is assigned to the vertical Y-axis, but may be alternately provided with programmable alternatives which allow it to be used as a scroll wheel for any pointer axis. In a typical arrangement for the device of FIGS. 3–20, either a left or a right lower-rear-side function key 314 or 315 is utilized to actuate either miniswitch 314A or 315A to alter wheel 328 from a standard scroll mode to an autoscroll function mode and back to a standard scroll function mode.

Alternately, the placement of wheel 328, or its various encoders, control keys, and switches could be otherwise wired, positioned and be made suitably connective with other non-control supports or surfaces of the device within the reach of a controlling finger during rotational use of the device.

When used as a scroll wheel, wheel 328 is typically controlled by a stroking motion, up or down, of the thumb or another digit on wheel 328 or on enclosure 328L causing wheel 328 to rotate about axle 328F within supports 328G, 328H. This then causes wheel surface 328K and indicia 328E to rotate between LED 328I and photodiode 328J. The provided digital signals then pass to and are processed by standard electronic components on circuit board LB, which signals are then typically carried out through I/O cable 317 (or by other means, as is better explained below) through exit hole 317A to mouse control software MCS within the Computer to instruct the computer to scroll pointer icon > and its cursor icon +. If a function key such as key 314 has been programmed to set wheel 328 into an autoscroll mode, and function key 314 is utilized by the user, rotation of wheel 328 in either an up or down direction will induce the autoscroll to move pointer icon > and cursor icon + in that mode.

Circuitry

Since the various embodiments of a multimodal device represent only sizing and configurational changes in well known elements of the prior art, the included electronic components in the various multimodal devices shown and described may be fairly termed standard or conventional in the art, and therefore require little detailed explanation.

Referring to FIG. 4, all explanations of circuitry given below which apply to control ball encoding sensors 305, 306, function key switches 307A–315A, wheel sensors 328I, 328J, and reverser switch 326A of the multimodal device of FIGS. 4, 9–12, also equally apply to the equivalent elements in the two basic multimodal devices of FIGS. 1–2H, with the exception of left-right function key reverser switches 106, 206, which are well known in the prior art and require no further explanation.

In addition to showing the above mentioned electronic components, FIG. 4, also shows a standard or enhanced mouse-type control software, represented in the drawing by a boxed-in "MCS." Mouse control software MCS is shown within a standard computer, represented in the drawing by a boxed in "Computer." The Computer is further connective with a display screen, represented in the drawing by a boxed-in "Display Screen." The Display Screen also has two boxed-in icons, a pointer icon, represented in the drawing by a ">," and a cursor icon, represented in the drawing by a "+".

FIG. 4 also shows:

a conventional mouse or trackball type logic board internal to control shell 301, represented in the drawing by a boxed-in "LB;"

a first conventional wireless transmitter module internal to control shell 301, represented in the drawing by a boxed-in "WTM1";

a first suitable conventional power source, typically in the form of batteries, internal to control shell 301, represented in the drawing by a boxed in "PS1";

a first suitable on-off switch, represented in the drawing by a boxed-in "S1."

a tactile force module, internal to control shell 301, represented in the drawing by a box-in "TFM1" (If a tactile force module TFM1 is present in the circuitry of control shell 301, its function would be to take advantage of current computer software applications which allow various types of motion responses such as vibration or other electromechanically induced motions which tactile sensations would then pass from module TFM1 into control shell 301 and thence into the user's hand);

a base stand for control shell 301, represented in the drawing by a boxed-in "Base Stand", explained later in terms FIGS. 21–27;

a second conventional wireless transmitter module external to control shell 301 contained in a Base Stand, represented in the drawing by a boxed-in "WTM2";

a second suitable conventional power source, typically in the form of batteries, external to control shell 301 contained in a Base Stand, represented in the drawing by a boxed in "PS2";

a second suitable on-off switch, represented in the drawing by a boxed-in "S2."

a suitable conventional outlet-powered recharger unit system for external power source PS2 contained in a Base Stand, represented in the drawing by a boxed-in "RC";

a suitable alternating current outlet source for external recharger unit RC contained in a Base Stand, represented in the drawing by a boxed-in "AC";

a receiver module, represented in the drawing by a boxed-in "RM" suitable for receiving a wireless data stream from either first or second wireless transmitter modules WTM1, WTM2;

and, also shown in the drawing are various circuit interconnections, all of which components and circuits are explained more properly below.

Referring again to FIG. 4, the internal wiring of control shell 301 is interconnected by I/O wire cable 317. Cable 317 leads upward into control shell 301 either from a lower frontal cable exit hole 317A or from an alternate connector port 318A, shown in phantom lines. Cable 317 first interconnects with logic board LB, and then proceeds to interconnect logic board LB with function key miniswitches 307A–315A, ball sensors 305, 306, wheel sensors 328I, 328J, reverser miniswitch 326A, and, if present, tactile force module TFM1. With these electronic elements then interconnective with logic board LB, the consolidated signal data stream within cable 317 exits logic board LB and returns to either cable exit hole 317A or to alternate connector port 318A, if present. If a first wireless transmission module WTM1 with a first power source PS1 and first on-off switch S1 are present within control shell 301, cable 317 will also be interconnective with module WTM1 to enable it to be interconnective with logic board LB.

The data stream from cable 317 coming from logic board LB will then exit control shell 301 in one of three primary ways as dependent on how control shell 301 has been designed and manufactured.

If control shell 301 has been provided with an exit hole 317A for I/O cable 317 to exit as a hard wired mouse port connection with a Computer, then cable 317 will continue through exit hole 317A and reach its terminus in a standard pin plug connector 317B, that is, in a Universal Serial Bus [USB] or Mouse Port [PS/2], or serial connector, which is made connective with a connectively equivalent computer mouse-type port 329 in the Computer so that the data stream from cable 317 may interconnect with mouse control software MCS in the Computer.

If control shell 301 has been provided with an alternate connector port 318A, then cable 317 will terminate at port 318A, as shown in dashed-line alternate circuit path 318B. In this alternate circuitry scheme, an alternately provided double-pin-plug connector I/O cable 318, which has a standard mouse-type connector plug on both ends of the cable, being a first plug 318C, and a second plug 318D, which are then utilized to interconnect port 318A with port 329.

If control shell 301 has been provided with an internal wireless transmitter module WTM1, it will also have been provided with an alternate module on-off switch S1. If switch S1 is actuated, power source PS1 will actuate module WTM1. Module WTM1 then utilizes electromagnetic waves, or an alternate wireless modality, to pass the data stream from cable 317 wirelessly along alternate wireless transmission path 317C and thence to a suitable wireless receiver module RM which is connective with and powered by alternate I/O cable 317D which is connective with mouse control software MCS in a standard Computer. Alternately, wireless transmission module WTM1 may be a self-contained plug-in module suitable for plugging into some portion of the material body and internal wiring scheme of control shell 301.

Typically, if control shell 301 is provided with an alternate port 318A, control shell 301 will also be provided with a wireless transmitter module such as WTM1, so that a user may choose between a wired or wireless use mode. Alternately, control shell 301 may be provided with an alternate port 318A and an alternate connector cable 318, but no internal wireless transmitter module.

Cable exit hole 317A with either continuous exiting I/O cable 317 or alternate connector port 318A with alternate cable 318 is typically positioned at the frontal bottom area of control shell 301 because this placement is preferable to keep either cable 317A or 318A from interference with the operating fingers of the user in the typical mode-use positions of the multimodal device.

Alternately, a shorter version of double-pin-plugged cable 318, I/O wire cable 318E is utilized to plug directly into an equivalent connector port 318F of a Base Stand of the types depicted in FIGS. 21, 23, 25 in order to obtain further use features. When cable 318E is plugged into both control shell alternate port 318A and into port 318F in the Base Stand, the data stream from cable 317 passes through cable 318 and its interconnectors into the circuitry of the Base Stand where wireless transmitter module WTM2 may be contained. If the Base Stand has been provided with an internal wireless transmitter module WTM2, it will also have been provided with an alternate module on-off switch S2. If switch S2 is actuated, power source PS2 will actuate module WTM2. Module WTM2 then utilizes electromagnetic waves or an alternate wireless modality to pass the data stream from cable 317 wirelessly along alternate wireless transmission path 318L and thence to a suitable wireless receiver module RM which is connective with and powered by alternate I/O cable 318E, which is also connective with mouse control software MCS in a standard Computer. Typically, if a Base stand is provided with an alternate port 318A, the Base Stand will also be provided with a tactile force module TFM2.

Wireless transmitter module WTM2, if present in the Base Stand, has a power source PS2, typically in the form of rechargeable batteries, which may also have a built-in recharger unit RC and a standard outlet connection AC for recharger unit RC. This will be later explained more clearly in terms of FIG. 21.

In all four of the above electronic interconnection schemes between control shell 301's internal circuitry and a Computer, once the data stream has reached mouse control software MCS of the Computer, it will be processed by the Computer operating system and sent via I/O cable 330 to a Display Screen where a pointer icon > and a cursor icon + appear, and where the data stream will then be in control of both icons' positional and operational display functions.

In order to keep the specification more clear, prior to any further account of the alternate data transfer scheme utilizing a Base Stand, which is explained in terms of FIG. 21, all further discussion of data stream transfers between the internal components of control shell 301 and a Computer will be limited to the basic scheme wherein a hard-wired cable 317 is utilized for an interconnection with a Computer via exit hole 317A, and wherein alternate port 318A is omitted from the drawings, with the understanding that all of the above explanations of alternate data stream interconnections between control shell 301 and a Computer are incorporated by reference.

Slides and Rotatable Supports

When a multimodal pointer device has three control ball sides protrudingly exposed, as does the device of FIGS. 3–20, it is necessary to structure the device so that any added-in slides, such as a top left slide 332L, a top right slide 332R, a bottom left slide 333L, and a bottom right slide 333R, are precisely extended to the sides of control shell 301 so that they are parallel with major axis 323A at an even distance with the protrusion of control ball 302 from axis 323A. Slides 332L, 332R, 333L, 333R are thus positioned at the same distance from axis 323A as is ball 302. Slides 332L, 332R, 333L, 333R are typically made as a formed part of control shell 301's support and cover sides, but may also be provided with a thin covering of Teflon or other suitable slippery material. Slides 332L, 332R, 333L, 333R may either be done in a rectangular parallelepiped form, or, alternately, may be rounded at their ends and rounded along their length to promote both sliding ability and safety in handling. Slides 332L, 332R, 333L, 333R are utilized whenever the device of FIGS. 3–20 is to be used in a standard mouse mode, that is, when it is to be slid along a surface to cause control ball 302 to rotate by friction against the surface, as is shown in FIGS. 13, 17, which will be more properly explained below.

In order for a multimodal pointer device with more than one control-ball-control-surface side protrudingly exposed from a control shell to properly change from a non-horizontal use mode to a horizontal use mode as a trackball, a minimum of one support, as was shown and explained for the device of FIGS. 2–2H may be utilized. As variously shown in FIGS. 3–16, and particularly in FIGS. 7, 14–16, the top 301D and bottom 310C of control shell 301, respectively, have equivalent rotatable supports, top rotatable support 334 and bottom rotatable support 335, which are typically both used when tilting control shell 301 into a horizontal, stationary trackball mode. The cam action of both supports 334, 335 acting together lift up the front edge of control shell 301 on either the left or right side to allow control ball 302 to freely rotate without touching a work surface 336.

Supports 334, 335 are each, respectively, a thin, ellipsoid plastic or other suitable material support, each of which has: a. a laterally disposed frontal grip tab, a top tab 334A, and a bottom tab 335A; b. a vertically disposed, centrally located, axle with a circular, flat cap, a top axle-cap 334B, and a bottom axle-cap 335B; c. two vertically disposed circular, rounded-top pegs, a top set of pegs, left peg 334C, right peg 334D, and a bottom set of pegs, left peg 335C, right peg 335D. Top rotatable support 334 is typically formed of plastic or other suitable material and made as one unit consisting of tab 334A, axle-cap 334B, and pegs 334C, 334D. Equivalently, bottom rotatable support 335 consists of tab 335A, axle-cap 335B, and pegs 335C, 335D typically formed of plastic or other suitable material and made as one unit.

Supports 334, 335 are, respectively, positioned congruently at the top 301D and at the bottom 310C of control shell 301 so that each rotates with its respective axle-cap, 334B, 335B within a circular retaining hole, being a top retaining hole 334E and a bottom retaining hole 335E, each of which is half-formed in the support half of control shell 301, and half-formed in the cover portion. The top 301D and bottom 310C of control shell 301, respectively, each have provided, a set of six top circularly arranged locking holes 334F, and a set of six bottom circularly arranged locking holes 335F, each of which holes is suitably sized to accommodate pegs 334C, 334D, 335C, 335D in an attachably-detachable pressure fit. When the device is not being used in a trackball mode, top pegs 334C, 334D, and bottom pegs 335C, 335D, respectively, remain locked into the two frontal top and bottom holes pairs of hole sets 334F, 335F by the spring action of the plastic material of supports 334, 335. When rotatable supports 334, 335 are to be rotated for use during a horizontal trackball mode for utilization as a lateral side-lift support, tab 334A and tab 335A, are, respectively, gripped by the user's digits and pushed slightly downward to release rounded pegs 334C, 334D and 335C, 335D from their frontal locking holes. Supports 334, 335 are then rotated clockwise or counterclockwise until their respective rounded peg sets 334C, 334D and 335C, 335D reach a desired position in an adjacent set of holes in hole sets 334F, 335F in the top and bottom of control shell 301. The grip pressure is then released and pegs 334C, 334D and 335C, 335D are urged by the aforementioned plastic spring action into, and lock within, the selected holes. The device is then set on its side and utilized in a trackball mode. When the mode is to be changed, the reverse of the procedure just described may be utilized to return supports 334, 335 to their normal storage position.

Alternately, rotatable supports 334, 335 may have their respective frontal edges provided with knurled, striated, or other friction-inducing markings or coverings. And, alternately, supports 334, 335 may be made thicker for improved stability and surface grabbing ability.

Operation

FIGS. 3–20—Preferred Embodiment

In FIG. 3, the multimodal pointer device is representatively shown (in phantom lines) being held in-air using a right hand 316 on-edge, with a right palm 316A facing left, and with a right arm (not shown) holding the device vertically and extended slightly outward from the body. This is one of several basic ways in which to hold the device as dependent upon the mode chosen and the user's individualized grasping and actuation preferences. Whether the device is set upon its base upon a surface, or used in-air, or used in conjunction with a suspension or surface base stand, it is a matter of the user's personal preferences as to which digits of which hand will be used in any given mode for the actuation of control ball 302 and the actuation of the respective function keys 307–315. Typically, in a basic on-edge grasping method, the fingers which are free at any given moment are used as the support fingers which, when coupled with the on-edge grasp of thumb and palm, form a triangulated support system. The use of provided recessed finger rest areas, upper front recessed area 322, middle front recessed area 322A, lower front recessed area 322B, and rear recessed area 322C, which are molded into the material of control shell 301, also allows for further support and orientational control over the mass of the device.

In-Air and On-Base Upright Mode Operation

Referring to FIG. 3, in order to utilize control shell 301 in a generally upright orientated mode, for use in-air, or standing on its base on a surface, or, as will be later explained, intercooperatively with a base stand, control shell 301 is typically held on-edge as shown so that control ball 302 and frontal function keys 308, 309 are facing forward and away from the user. In this position, the multimodal pointer device may be used either by a left or a right hand, as will be explained more clearly below.

As shown in FIG. 3, the device is typically grasped by a right hand 337 so that thumb T is positioned on the left side of control shell 301, but may also operate rear function key 307, and so that index finger I is placed on the right side of control shell 301, with middle finger M positioned just below index finger I, and the ring finger R positioned just below middle finger M, with the tips of the middle and ring fingers M, R extending around the frontal portion of control shell 301 and resting lightly on upper and lower frontal function keys 308, 309 so that, according to hand size, either the tips of middle and ring fingers M, R, or the bending area between the first and second sections of middle and ring fingers M, R, capture a portion of the surface of function keys 308, 309. The little finger L is then placed against control shell 301 in a similar manner and typically positioned within a provided lower front recessed area 322B formed within the plastic housing of control shell 301. Using this triangulated bracing method of the inner crotch of the thumb T and index finger I of the palm 316A, the user can easily maintain his on-edge hand position relative to the elongated portion of the device when operating control ball 302 omnidirectionally, or triggering function keys 307–309.

The device may then be held and operated in-air, or with its bottom rotatable support 335 against a surface, or held in a tilted, or otherwise angled, or horizontal position, utilizing the same grasp that was just explained.

Because of the inherent symmetry of the multimodal device of FIG. 3, control shell 301 may be equivalently held by a left hand on-edge, with a left palm facing right as is shown in terms of FIG. 20 where a left index finger I is shown operating control ball 302, and a left thumb T is shown (in hidden lines) operating scroll wheel 328, and where left ring and little fingers R, L are, respectively, shown operating upper frontal function key 308 and lower frontal function key 309, and where little finger L is shown resting in lower front recessed area 322B. FIG. 20 also shows thumb T alternate positions in dotted oval lines wherein thumb T is operating a rear function key 307 or resting on the rear edge of control shell 301.

Mouse Mode Operation

Referring to FIGS. 13, 17, in order to utilize control shell 301 in a mouse mode, control shell 301 is laid onto a horizontal work surface or mouse pad 336 with either side down, according to handedness or preference, so that control ball 302 and frontal and rear function keys 307–309 are to one side or the other, and so that one set of left-right upper frontal and upper rear function keys 310, 311 or 312, 313 are then facing upward and are positioned away from the user and may be actuated as a standard set of left and right mouse-type function keys. Control shell 301 is at this point resting on either its left or right side, with one protruding control surface side of control ball 302 and either set of slides, 332L, 333L or 332R, 333R resting against a surface or mouse pad 336.

For a right hand mouse operation, the device is typically laid on its right side. Control ball 302's right-protruding-control-surface side, and top and bottom right side slides 332R, 333R then rest against work surface 336. This makes the top of the device become the "front of the mouse" and the front edge with function keys 308, 309 become the "left side" and the rear edge with function key 307 become the "right side" of the "mouse." In use, the palm (not shown) of the user's preferred hand rests near the right side's lower portion and the device is then operated in a mouse modality using a standard mouse grasp wherein the thumb T rests to the "left" side below control ball 302 and above upper front function key 308. The ring finger R and little finger L are then moved to the rear edge (now the "right" side) below rear function key 307. The index finger I and middle finger M are extended away from the user and the index finger I is arced over control ball 302. The function of the now up-facing front-rear function keys 310, 311 or 312, 313 remains a constant left-right unless their programming is reversed within the mouse control software MCS of the Computer. The index and middle fingers, I, M, will actuate the now up-facing upper function keys while control shell 301 is utilized in a mouse modality, and either the index I or middle M finger or thumb T may actuate single-axis encoding wheel 328. Or, upper front function key 308 and rear function key 307, if programmed to do so, may be utilized as a left and right function key, as was explained for the device of FIGS. 2–2H. If a left hand use is desired, the device is turned to its left side and encoder reversal key 326 is actuated. The device is then held and operated in the same manner as just described.

As noted above, when the device is placed into a mouse mode position, the "mouse" is either typically placed in a standard mousing position on a standard mouse pad or other suitable flat work surface area, but may also be held and used on any continuous surface, whether angled, vertically inclined, or appropriately continuously curved, for example, as in a U- or C- shape.

Trackball Mode Operation

Referring to FIGS. 14–16, 18, in order to utilize control shell 301 in a stationary trackball mode, top and bottom rotatable supports 334, 335 are respectively lifted using their grip tabs 334A, 335A, and their locking pegs 334C, 334D, 335C, 335D are lifted and rotated out of their locking hole sets 334F, 335F and rotatable supports 334, 335 are then respectively rotated in the same direction where they are then released into either another sequenced set of the circularly arranged holes as dependent on the left hand-right hand orientation which the user chooses. Typically, for right handed use, the device is tilted up on its right side (with control ball 302 facing left), and for left handed use, onto its left side and reverser key 326 actuated.

Referring to FIGS. 14–16, once control shell 301 is laid onto a work surface or mouse pad 336 with the rear edge of control shell 301 down and resting both on the exposed edges of supports 334, 335 and the rear tips of slides 332L, 333L or 332R, 333R, a quadrilateral support base is formed for further use of the multimodal pointer device as a stationary trackball. Once in this support position, control ball 302 has been lifted slightly up from surface 336, and control ball 302 is facing left or right according to preference, so that control ball 302 and frontal function keys 308, 309 are facing on a slight upward angle, and so that rear function key 307 is facing on a slight downward angle.

For a right hand trackball operation, the device is typically tilted upward on its right side. Control ball 302 is then lifted up toward the user's left side. This makes the top of the device become the "front" of the "trackball," and the front edge with function keys 308, 309 become the "left side" and the rear edge with function key 307 become the "right side" of the "trackball." In use, the palm (not shown) of the user's preferred hand rests near the preferred side's bottom and the device is then operated in a trackball modality using a standard mouse-like grasp wherein thumb T rests to the "left side" below control ball 302 and above upper front function key 308. The ring finger R and little finger L then move to the opposite "right" side below rear function key 307. The index finger I and middle finger M are then extended away from the user. Index finger I, or middle finger M, or thumb T may be used to rotate control ball 302, or thumb T and index or middle fingers I, M may be alternately utilized together to rotate control ball 302 as a trackball for improved control accuracy on detail work.

The function of the now up-facing left-right function keys 310, 311, or 312, 313 remains a constant left-right unless their programming is reversed within the mouse control software MCS of the Computer. The index and middle fingers I, M will actuate the now up-facing function keys while control shell 301 is utilized in a trackball modality, and either the index or middle finger I, M or thumb T may be used to actuate single-axis encoder wheel 328. Or, upper frontal function key 308 and rear key 307, if programmed to do so, may be utilized as a left and right function key, as was explained for the device of FIGS. 2–2H. In the trackball mode, this latter choice is preferable because of the frequent need to depress the left function key while changing the pointer position by rotating control ball 302. If a left hand use is desired, the device is turned to its opposite side and encoder reverser key 326 is actuated. The device is then held and operated in the same manner as just described.

Stroker Mode Operation

Referring to FIG. 19, the multimodal pointer device may, for various reasons explained below, be utilized in a "stroking mode" wherein control ball 302 frictionally engages a horizontal surface 336, or a vertical surface 336A, or an angled or a curved surface (not shown). To utilize the stroker mode, the device is held in the above described on-edge position and tipped forward until control ball 302 frictionally engages a chosen work surface such as 336, 336A. Alternately, the grip may be changed so that control ball 302 may frictionally engage a chosen surface for a further distance. This is done by moving the digit being used to actuate upper frontal function key 308, in this case, index finger I, shown in hidden lines, to the side and placing control shell 301 in a more extended on-edge position toward the chosen surface, or rotating control shell 301 to more of side-tilted angle, so that upper frontal function key 308 does not so quickly encroach upon the surface where the stroking will occur. Once control ball 302 frictionally engages a surface, the device is "stroked" vertically, horizontally, diagonally or in a curve or a circular motion as required by the pointer movement to be performed. Stroking is preferable when the device is used in-air and a long horizontal axis change is needed, or when the control ball operating finger is fatigued, or simply when one prefers the method.

Suspension and Base Stands
Description

Referring to FIGS. 21–25, a control shell suspension hanger 338 and a control shell base stand 339 are shown as inter-cooperative devices of the invention which have no purpose outside the scope of the invention, but which are a useful component of the invention for a variety of reasons. When a pointer device is multimodal, its multiple mode use leads to several critical issues such as: In what orientation should the device be temporarily stored? How may it be easily, quickly and safely stored out of the way while remaining immediately accessible to be easily, quickly and safely restored to a mode use position? How can the device be used in conjunction with a convenient support method for the grasping hand and its wrist? Also, how can the device be conveniently secured for both storage and use in a preferred pre-set operating position?

While it is true that the multimodal pointer device can be simply left standing on its bottom rotatable support 335 as a base, or set down on one of its sides adjacent to a computer keyboard, it is often advantageous to have the device in a secure environs where it is both out of the way and immediately accessible for use. The availability of a cooperative suspension stand such as a magnetic suspension stand 338 depicted in a right side view in FIG. 21 and in a front view in FIG. 22, enables the user to place the multimodal device in a removed but accessible position relative to the work area. Suspension hanger stand 338 is a right-angled temporary storage hanger which has a horizontal member 338B and a vertical member 338C. Member 338B and 338C may either be made as one plastic or other material piece or may be made suitably connective with one another by a pressure fit peg and hole and/or an adhesive (not shown). Stand 338 is utilized in one of several alternate ways depending upon its method of manufacture, as is explained below.

A cooperative magnetic base stand 339 is exemplified in a left side diagrammatic and schematic view in FIG. 21, and in a diagrammatic front view in FIG. 23. Base stand 339 is also shown in an overhead diagrammatic view in FIG. 25. A base stand such as surface base stand 339 presents the manufacturer as well as the user with the possible provision of a number of other useful options and features, such as: the addition of a palm-edge wrist comfort-support pad, such as a comfort-support pad 341 exemplified in FIGS. 25–27; or, the addition of an intermediate wireless transmitter module, such as a wireless transmission module represented in FIG. 21 by a boxed-in "WTM2"; or, the addition of a tactile feedback (force-felt) module, such as a tactile feedback module represented in FIG. 21 by a boxed-in "TFM2", along with a power source, such as a rechargeable battery, represented in FIG. 21 by a boxed-in "PS2", along with a suitable on-off switch, represented in FIG. 21 by a boxed-in "S2", along with a recharger for a battery if present, represented in FIG. 21 by a boxed-in "RC" along with a suitable outlet power source represented in FIG. 21 by a boxed-in "AC", all of which components will be explained more fully below. In order to avoid overcomplicating FIG. 21, all of the boxed-in components which are housed within base stand 339 are collectively represented in FIG. 21 by a boxed-in "XXX" with a dashed arrow pointing to a series of connected boxes containing the listed components.

In order to utilize a magnetic hanger or surface base stand, control shell 301 is provided with a top and/or bottom, suitably sized, magnetically attractable material piece suitable for attaching to magnetic surfaces, typically a thin circular steel plate, such as a top metal plate 301E, or an equivalent bottom metal plate 301F. Plates 301E, 301F are respectively provided with an adhesive backing (not shown) suitable for attaching plates 301E, 301F, respectively to control shell top rotatable support 334, and bottom rotatable support 335, as shown so adhesively attached in FIG. 21. Metal plate 301E may then act cooperatively with an overhead magnetic plate such as a magnetic plate 338A located beneath a horizontal arm 338B of suspension hanger 338 to become magnetically connective and attachably detachably suspend control shell 301 for storage or further use. Or metal plate 301E may be made magnetically connective to a magnetic plate 340A and attachably detachably suspended from an inverted omnidirectional ball housing 340, as shown in phantom lines in the upper portion of FIG. 21.

Suspension hanger stand 338 typically has a stick-on adhesive backing 338E on the back side of a vertical member 338C, and a stick-on adhesive backing 338D on the back side of horizontal member 338B. Vertical stick-on backing 338E may be adhesively attached to the side of a computer monitor screen or to a vertical cabinet surface in the work area. Horizontal stick-on backing 338D may be adhesively attached to the underside of horizontal cabinet surfaces, or act in conjunction with vertical stick-on backing 338E in right angle enclosures.

Alternately, vertical member 338C may be extended to reach and attach with a work surface base stand, such as is shown in FIG. 21, to form a work area stand for the device. The multimodal device would could also be made operable while suspended from equivalent hangers if horizontal member 338B were sufficiently extended. In addition to utilizing a hanging stand such as hanger 338, for simple temporary positioning or storage of the device, the device could alternately have numerous equivalent suspension schemes. For example, alternately, control shell 301 may be slid on its respective top or bottom side sliders into a provided receptacle area within or below horizontal member 338B. Or alternately, the aforementioned attachably detachable magnetic connections could be replaced by hook and loop material connections. And, alternately, a control shell could be suspended by bracketed C-type or inverted L-type or U-type holders adhesively affixed, for example, to the side of a monitor, which suspends control shell 301 by gravity, or which utilizes alternate magnetic means or alternate hook and loop fasteners.

Figure 24:
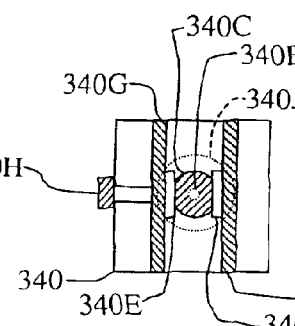
FIG. 24 shows a diagrammatic top view of the omnidirectional support system.

In FIGS. 21, 23, 25, a surface base stand 339 is shown which is magnetically attachably detachable with an invertible, omnidirectional ball housing 340. FIG. 24 shows a diagrammatic top view of the omnidirectional support system.

Referring to FIG. 21, the preferred embodiment of the multimodal pointer device of FIG. 3 is shown with control shell 301 standing upright with bottom metal plate 301F magnetically connective and attachably detachable with omnidirectional ball housing magnetic plate 340A. Omnidirectional ball housing 340 is itself attachably detachably magnetically connective to surface base stand 339 whenever ball housing lower magnetically attractable plate 340I is made magnetically connective with upper surface base stand magnetic plate 339D. As noted above, and shown in phantom lines in FIG. 21, omnidirectional ball housing 340 may be detached from its magnetic connection with surface base stand 339 and then inverted and utilized with suspension hanger 338.

Magnetically attractable plate 340I is centered over a box-shaped ball housing 340, and also centered over and suitably connected with a thin metal or other material rod 340B. Rod 340B is then also connective with a rotatable metal or plastic ball 340C. Rod 340B may be of the same material as plate 340I and ball 340C as shown, or may be screw-connected between plate 340I and ball 340C if provided with screw thread upper and lower tips so that rod 340B may be screw-connected at its upper end within a threaded screw hole in plate 340I and screw-connected at its lower end within a threaded screw hole within ball 340C (not shown).

Ball 340C is caged between a left ring collar 340D and a right ring collar 340E. Right ring collar 340E is suitably affixed to or made as a molded part of an adjustable knobbed bolt 340H. Bolt 340H extends through a hole (filled by bolt 340H) in the right side of ball housing 340. Bolt 340H terminates in a typically round, flat knob which is suitably sized to be manually rotated within a threaded hole (not shown) within a right vertical support 340G. When rotated in its threaded hole in support 340G, bolt 340H pushes right ring collar 340E toward or away from ball 340C. Left ring collar 340D is opposite to right ring collar 340E and is either suitably adhesively or otherwise affixed to or made a molded part of left vertical support 340F.

Bolt 340H serves to loosen or tighten the current positioning of ball 340C. The setting of ball 340C within ring collars 340D, 340E allows ball 340C to be angled omnidirectionally starting with an upright position. As adjustable knobbed bolt 340H is rotated on its screw threads through support 340G toward ball 340C, ring collar 340E exerts sufficient pressure against ball 340C to push ball 340C against left ring collar 340E and so enables ring collars 340D, 340E to establish a temporary locking adjustment of the use angle of the magnetically mounted control shell 301.

Figure 27:
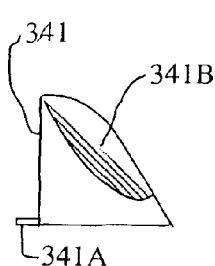
FIG. 27 shows a diagrammatic left-side cross-section view of a comfort-support pad.
Figure 26:
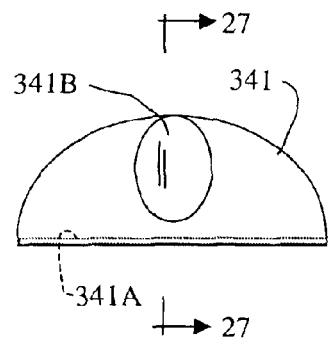
FIG. 26 shows a diagrammatic rear view of a comfort-support pad.

Base stand 339 also contains a metal weight 339B of suitable mass to counterweight against control shell 301's mass in any tilt position. Base stand 339 also has a rearward horizontal slot 339C for the introduction of a forward connector 341A of a comfort-support pad 341. FIG. 25 shows a diagrammatic top view of the base stand of FIGS. 21, 23 and also shows a top view of comfort-support pad 341. FIG. 26 shows a diagrammatic rear view of comfort-support pad 341. FIG. 27 shows a diagrammatic left side cross section view of comfort-support pad 341. Pad 341 is a partial ellipsoid, curved-topped gel or foam filled, cloth-like material container with a central oval groove 341B for support of the palm edge and wrist. The forward rectangular plastic connector 341A of pad 341 is suitably sized to enable a tight pressure fit within rearward horizontal slot 339C within base stand 339.

If tactile force module TFM2 is present in the circuitry of a base stand, its function is to take advantage of current computer software applications which allow various types of motion responses such as vibration or other electromechanically induced motions which tactile sensations would then pass through stand 339, ball housing 340, and then to ball 340C and its support connections with a magnetically mounted control shell 301 and thence into the user's hand. Base stand 339 and pad 341 typically have non-slip rubberized bottom surfaces adhesively or otherwise suitably attached to their undersides (not shown).

Operation

When a user of the multimodal device of FIG. 3 wishes to place the device into temporary storage or a rest position, he may easily, quickly and safely store the device either by utilizing a suspension hanger method wherein control shell upper plate 301E is placed against hanger plate 338A; or, by placing control shell bottom plate 301F against upper base plate 339D. When the user wishes to operate the multimodal device within the context of the omnidirectional ball system, ball housing 340 is attachably detachably magnetically connected either: a. inverted to hanger 338 by placing ball housing lower plate 340I against hanger plate 338A, and then placing upper ball housing plate 340A against upper control shell plate 301E, as shown in the upper portion of FIG. 21 in phantom lines; or, b. ball housing 340 is attachably detachably magnetically connected upright to stand 339, by placing lower ball housing plate 340I against upper stand plate 339D, and by placing upper ball housing plate 340A against lower control shell plate 301F, as shown in the lower portion of FIG. 21. Once ball housing 339 is in either of these two use positions, knobbed bolt 340H is rotated (typically counterclockwise) to sufficiently loosen right collar ring 340E so that ball 340C will rotate freely. Control shell 301 of the multimodal device is then grasped on-edge, as was explained in terms of FIG. 3. Control shell 301 is then manually rotated on its longitudinal axis along the radial turning axises of rod 340B as it rotates ball 340C. If a preferred angle of use is achieved, knobbed bolt 340H is tightened (typically clockwise), which presses right ring collar 340E against ball 340C and holds it in that position. When omnidirectional ball system 340 is utilized in an inverted manner within suspension hanger stand 338, the same general use method applies as was given for upright control.

Comfort pad 341 is utilized by inserting its forward rectangular plastic connector 341A in a pressure fit within rearward horizontal slot 339C within base stand 339. Once therein, the user may rest his on-edge palm in groove 341B and still manipulate control shell 301 through various angles.

If control shell 301 has a hard-wired connection system such as was explained in terms of FIG. 6 wherein a cable 317 exits control shell 301 and is connective with a Computer, control shell 301 may be used with a hanger stand 338, or a base stand 339, with or without an omnidirectional ball housing 340. If the additional features of a wireless transmitter WTM2, along with its power source PS2, on-off switch S2, recharger RC, and AC connection, and tactile force module TFM2 are to be utilized, control shell 301 must be of the alternate type described in terms of FIG. 6 wherein a double pin-plugged cable 318 is utilized. Referring to FIG. 21, control shell 301 as shown is of the type that has a pin-plug receptacle 318A in lieu of a an exit hole 317A, and which utilizes a longer double pin-plugged cable 318 for connection with a Computer, or a shorter double pin-plugged cable 318E. Typically, one would use longer cable 318 for multiple mode use for the multimodal device and disconnect control shell 301 from cable 318 in order to prepare for use with the features in a base stand. In this scheme, cable 318E would already have been either hard-wired into base stand 339, or would have one end of a double pin-plug cable already plugged into a suitable pin-plug receptacle 339E, awaiting further connection with control shell receptacle 318A.

Once a circuitry connection is established between the internal electrical components of control shell 301 and the internal electrical components of base stand 339, in either of the two ways listed above, the completed circuit will allow a data stream to pass between the two sets of electrical components. The data stream will then pass through the internal circuitry of base stand 339 to wireless transmitter WTM2 when on-off switch S2 is on and allows power source PS2 to energize the transmitter. Transmitter WTM2 will then pass its signals wirelessly via wireless wave path 318C to a suitable wireless receiver module, shown in FIG. 21 by a boxed-in "RM" which will then pass the signals via a hard wire cable 317D to mouse port 329 and thence into a standard mouse control software application, represented in FIG. 21 by a boxed-in "MCS", which is within a standard computer, represented in FIG. 21 by a boxed-in "Computer". The Computer-processed signals will then pass via a cable 330 to a suitable display screen, represented in FIG. 21 by a boxed-in "Display Screen" which shows a pointer icon, represented by a ">" boxed-in with Display Screen, along with a cursor icon, represented by a "+" boxed in with Display Screen. Control shell 301 may then be utilized in this manner until a mode change is desired, whereupon it will be reconnected with cable 318 which will then be connected with mouse port 329. Alternately, cable 318 may be connected directly to base stand receptacle 339E and control shell 301 then utilized as a multimodal device.

Alternately, a multimodal pointer device could have numerous alternate forms of base stands which rely either on simple placement of the device into a receptacle holder, or which utilize the base as a plug-in means for an alternate wiring system or wireless transmission system. Alternately, base stand 339 could be provided with a receptacle opening for accommodating an add-on wireless module which could be attachably detachably engaged with the internal circuitry of the alternate stand.

The Preferred Embodiment is an Enhanced Basic Embodiment

In its basic structural format, the multimodal device of FIGS. 3–20 is equivalent to the device that has been shown and described in terms of FIGS. 1–1H, in that it contains the basic components of the invention which are required to successfully control a computer display screen pointer while being operated in any one of several modalities. The device of FIGS. 3–20 contains: a. a control shell 301; b. a pointer device, a rotatable, multi-axis encoder, control ball 302; c. a minimum of two mouse-like function keys among the plurality of function keys 307–315 along with suitable miniswitches 307A–315A, able to function in at all of the described operational modes; d. suitable control ball sensors 305, 306, and signal transmission circuitry 317 able to connect with the mouse control software MCS of a Computer; e. a reverser key and miniswitch 326, 326A for reversing control ball sensor encoders 305, 306.

All other components which have been additionally placed into the structural context of the embodiment of FIG. 3 are superfluous to the operation of the device as a basic invention of a multimodal pointer device in which multiple modes may be utilized. The device of FIG. 3, absent of all the further components shown and described would still successfully function as either an in-air mouse, or as a horizontal mouse, or as a stroking mouse, or could be utilized standing on its base, or used in a suitable base stand. Moreover, by levering the embodiment of FIG. 3 horizontally over a thin flat object such as book, or on an angle over a levering object such as a pen, the device of FIG. 3 could be utilized as a stationary trackball with no further components added. Nonetheless, each of these additional components to be shown and described, serves to further enhance the operational value of the basic invention. The fact that FIGS. 3–20 shows a structural placement of three protruding control surfaces for control ball 302 within control shell 301 enhances the value of the basic invention by making it: a. easier for a left or right handed person to operate; b. enables the device to be utilized by virtually any sized hand, and easier for any sized hand to operate the device; c. allows use of the device while upright on its bottom rotatable support 335, or while upright when utilized with a cooperative static or dynamic, surface or suspension base stand. However, the multimodal pointer device of FIGS. 3–20 is not required to have three sides of control ball 302 protrudingly exposed make the device function as a multimodal pointer device in a manner equivalent to the basic embodiment of FIGS. 1–1H. And as with the device of FIGS. 1–1H, this is true irrespective of the general structural placement of the three protruding control surfaces of control ball 302 within control shell 301, that is, in an upper, middle or lower position along the frontal edge of the device, or whether placed more to the left, right of a side of control shell 301, and irrespective of the structural placement of the function keys 307–315 within control shell 301, that is, higher or lower, or closer or further apart than shown in FIG. 3. In all these circumstances, the essence of the inventional structure remains the same, and also irrespective of which hand appendages (thumb and fingers) are utilized to operate control ball 302 or function keys 303, 304.

DESCRIPTION AND OPERATION

FIGS. 28–37—Alternate Embodiments

In all of the previous drawings, FIGS. 1–27, the multimodal pointer method has utilized: a graspable, elongated control shell; b. a pointer device with encoders in the form of a control ball which is protrudingly exposed from a control shell on one, two or three control surface sides; c. a minimum of two function keys with suitable switchwork; d. reverser switches where required; e. support for lifting a control shell where required; e. a slide where required; f. connective circuitry for further connection with the mouse control software of a computer with a display screen. To this basic format there was also added a recessed supplemental, or auxiliary, single-axis pointer-controller wheel.

In FIGS. 28–37, alternate embodiments of the invention are pictorially illustrated which maintain the above format, and also provide an exemplification of some of the various configurations for one or more axis pointer controllers within the context of the method of the invention. The alternate embodiments of FIGS. 28–37 are respectively shown only with the alternately configured pointer control devices. The other above listed elements in the essential format for a multimodal pointer method are implied by reference to the preceding drawings, FIGS. 1–25, and may be variously positioned within a control shell within the alternate embodiments.

Whereas the embodiments of FIGS. 1–25 exemplify the basic and preferred configurations and sizings for the various elements of the invention of a multimodal pointer device wherein one or more pointer controllers, and two or more function keys, are utilized within a suitably supportive control shell housing, the invention also comprises alternately configured or sized elements which perform the equivalent functions within the context of the invention. For example, a multimodal device may have: a. one or more alternate pointer controllers which are alternately configured or sized; b. two or more function keys which are alternately configured or sized; c. a suitable support housing of a different shape or sizing than shown.

In terms of configurational alterations, this can mean that a pointer controller or a function key may be: a. differently sized or orientated relative to the support housing control shell; b. and/or, either at a different position between the top and bottom of a control shell, and/or at a different depth level within a control shell, so as to be required to be accessed by a finger operating within a recessed portion of a control shell.

Additionally, a function key or a pointer controller may be protrudingly exposed on one, two or three sides from the front or rear of a control shell. Also, a control shell may be altered in shape or size to better accommodate the incorporation of such alternate function keys or pointer controllers, or may be differently recessed than was shown in the included drawings, to better allow a digit to actuate the alternate function key or pointer controller. And also, the multimodal device may be operated either in a vertical and horizontal manner as was the preferred embodiment, or only in a horizontal manner as were the two basic embodiments, as dependent upon the chosen configuration and number of function key switches which might be incorporated into the alternate embodiment in question.

In order to further simplify the explanation of the multimodal devices of FIGS. 28–37, wherever a single-axis wheel pointer controller or a multi-axis control ball pointer controller may be either recessed within a control shell or extended external to a control shell, a dotted circle will indicate the smaller recessed pointer controller, and a larger solid circle will indicate the larger, protruding pointer controller. Either pointer controller may then be protrudingly exposed on one, two or three sides, as described.

Figure 28:
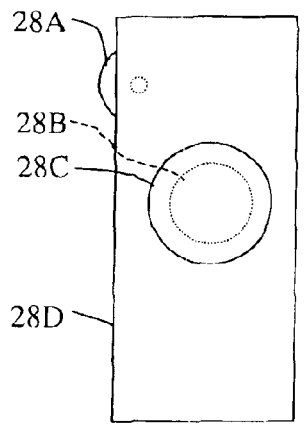
FIG. 28 shows a diagrammatic, left side view of an alternate embodiment of a multimodal device wherein a vertical single-axis wheel encoder is upper-frontally located, and wherein a multi-axis control ball encoder is mid-centrally located.
Figure 29:
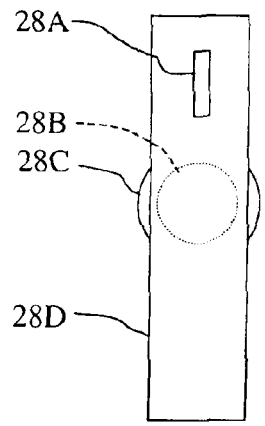
FIG. 29 shows a diagrammatic frontal view of the device of FIG. 28.

Referring to FIGS. 28, 29, which respectively show a left side view and a front view of an alternate embodiment, a vertically-orientated, single-axis wheel encoder 28A has been placed in an upper frontal position, and a recessed multi-axis control ball encoder 28B or an extended multi-axis control ball encoder 28C has been placed in a mid-central position within control shell 28D. Single-axis wheel encoder 28A may be otherwise angularly deployed, and control ball 28B or 28C, whichever is present, may be side-shifted to either side of control shell 28D and have one control surface side protrudingly exposed, or may be positioned as shown with two control surface sides protrudingly exposed.

Figure 30:
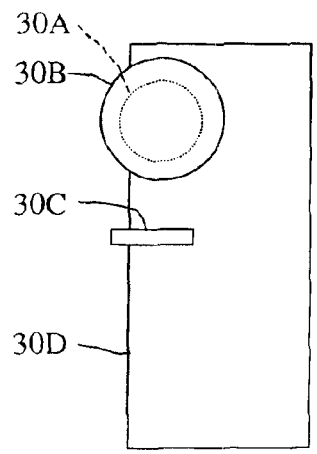
FIG. 30 shows a diagrammatic, left side view of an alternate embodiment of a multimodal device wherein a multi-axis control ball encoder is upper-frontally located, and wherein a horizontal single-axis wheel encoder is mid-frontally located.
Figure 31:
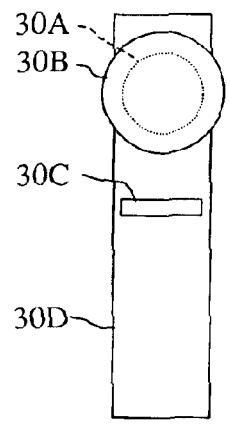
FIG. 31 shows a diagrammatic frontal view of the device of FIG. 30.

Referring to FIGS. 30, 31 which respectively show a left side view and a front view of an alternate embodiment, a horizontally-orientated, single-axis wheel encoder 30A has been placed in a lower frontal position, and a recessed multi-axis control ball encoder 30B or an extended multi-axis control ball encoder 30C has been placed in an upper-frontal position within control shell 30D. Single-axis wheel encoder 30A may be otherwise angularly deployed, and control ball 30B or 30C, whichever is present, may be side-shifted to either side of control shell 30D and moved slightly rearward and have one control surface side protrudingly exposed, or may be positioned further rearward while remaining in-between the sides of control shell 30D and have two control surface sides protrudingly exposed, or may be positioned as shown with three control surface sides protrudingly exposed from control shell 30D.

Figure 32:
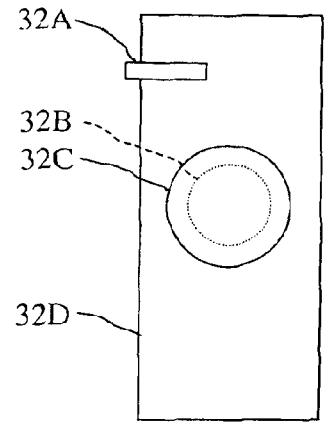
FIG. 32 shows a diagrammatic, left side view of an alternate embodiment of a multimodal device wherein a horizontal single-axis wheel encoder is upper-frontally located, and wherein a multi-axis control ball encoder is mid-centrally located.
Figure 33:
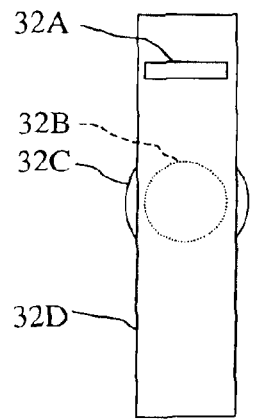
FIG. 33 shows a diagrammatic frontal view of the device of FIG. 32.

Referring to FIGS. 32, 33 which respectively show a left side view and a front view of an alternate embodiment, a horizontally-orientated, single-axis wheel 32A has been placed in an upper frontal position, and a recessed multi-axis control ball 32B or an extended multi-axis control ball 32C has been placed in a mid-central position within control shell 32D. Single-axis wheel encoder 32A may be otherwise angularly deployed, and control ball 32B or 32C, whichever is present, may be side-shifted to either side of control shell 32D and have one control surface side protrudingly exposed, or may be positioned as shown in-between the sides of control shell 32D and have two control surface sides protrudingly exposed, or may be positioned further forward or rearward and have three control surface sides protrudingly exposed from control shell 32D.

Figure 34:
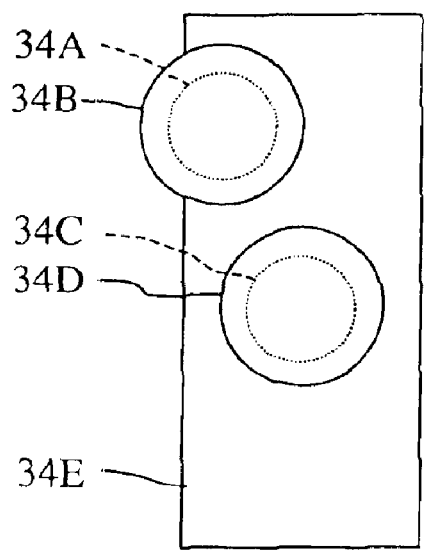
FIG. 34 shows a diagrammatic, left side view of an alternate embodiment of a multimodal device wherein a first multi-axis control ball encoder is upper-frontally located, and wherein a second multi-axis control ball encoder is mid-centrally located.
Figure 35:
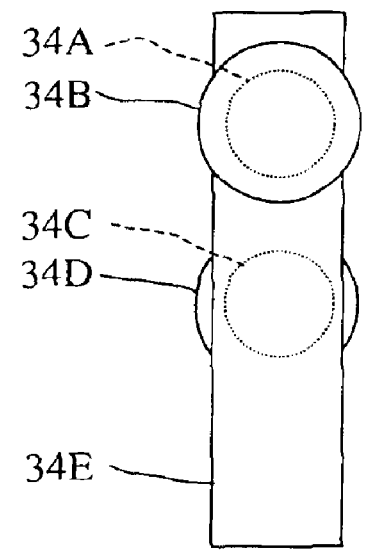
FIG. 35 shows a diagrammatic frontal view of the device of FIG. 34.

Referring to FIGS. 34, 35 which respectively show a left side view and a front view of an alternate embodiment, a first recessed multi-axis control ball 34A or a first extended multi-axis control ball 34B has been placed in an upper frontal position within control shell 34E, and a second recessed multi-axis control ball 34C or a second extended multi-axis control ball 34D has been placed in a mid-central position within control shell 34E. Control ball 34A or 34B, whichever is present, may be side-shifted to either side of control shell 34E and have one control surface side protrudingly exposed, or may be positioned in-between the sides of control shell 34D and have two control surface sides protrudingly exposed, or may be positioned as shown and have three control surface sides protrudingly exposed from control shell 34D. And control ball 34C or 34D, whichever is present, may be side-shifted to either side of control shell 34E and have one control surface side protrudingly exposed, or may be positioned as shown in-between the sides of control shell 34E and have two control surface sides protrudingly exposed, or may be positioned further forward or rearward and have three control surface sides protrudingly exposed from control shell 34E.

Figure 36:
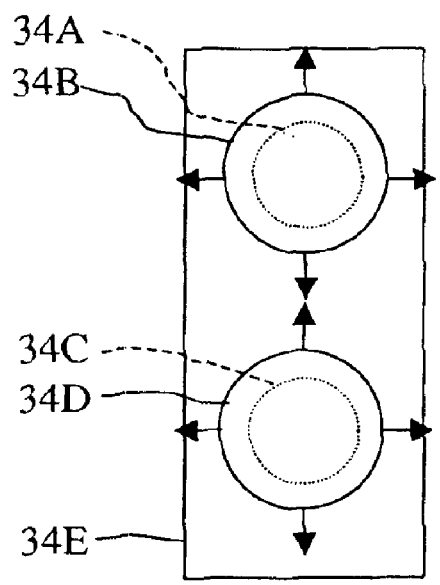
FIG. 36 shows a diagrammatic side view of an alternate embodiment of a multimodal device wherein a first multi-axis control ball encoder is upper-centrally located and wherein a second multi-axis control ball encoder is lower-centrally located.
Figure 37:
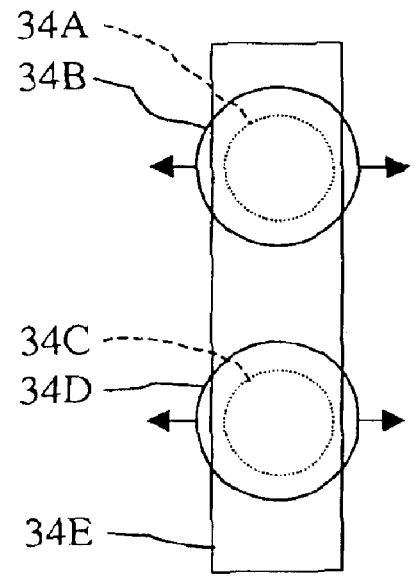
FIG. 37 shows a diagrammatic frontal view of the device of FIG. 36.

Referring to FIGS. 36, 37 which respectively show a left side view and a front view of the alternate device of FIGS. 34, 35 with the respective sets of control balls 34A or 34B, and 34C or 34D, in an altered vertical and horizontal positioning within control shell 34E. Directional arrows have been added to the drawing to indicate further possible movement of either member of either ball set 34A, 34B or ball set 34C, 34D within control shell 34E. The directional arrows indicate that either member or either control ball set may be moved up-down, left-right and in-out with respect to the sides of control shell 34E.

In all of the alternate embodiments shown in FIGS. 28–37, a suitably placed plurality of function keys could be provided, along with any required support or supports, slide or slides, and so forth, as were provided for the basic and preferred embodiments of FIGS. 1–27 without altering the essence of the invention of a multimodal pointer method. Referring to FIGS. 28–37, in principle, either one of the single-axis or multi-axis pointer devices indicated for the respective alternate embodiments may be replaced by other prior art pointer control device methods such as a roller, touch pad or mini-joystick, or other standard or miniaturized pointer control device, without deviating from the essence of the invention. However, utilizing alternate pointer device than those shown and described for the alternate embodiments of FIGS. 28–37 may affect the overall multimodal ability of the device, and it may then only be effectively utilized in one or a few of the possible modalities previously explained.

Conclusions, Ramifications and Scope

Alternately, if only certain modes are selected for use, a multimodal device may be otherwise shaped and contoured, e.g., alternately, any number of control shell housing shapes such as cylindrical, sectioned-cylindrical, half-sphere, rectangular box-like, hand-contoured, and various other shapes may be utilized. Alternately, the device could have a control ball positioned in a truncated upper frontal portion of a control member. Alternately, a multimodal device could be provided with a cradle that doubles as a receiver and battery charger connective with an AC outlet. Alternately, a comfort pad could be provided that extends around a base stand.

Alternately, a multimodal device may have added, indented-recessed areas for improved finger gripping at various points on its surface. Alternately, a multimodal device could have a retractable cord contained within its support housing, or utilize a retractable cord in a base stand environs. Alternately, the device could be miniaturized and used to work with a portable computer system or as an auxiliary device compatible with a portable laptop computer or with a palm computer or a television control system.

Alternately, a multimodal device may have a provided light diode in its circuitry and be utilized with suitable switching circuitry as a computer light pointer. Alternately, a multimodal device may have a provided pointer arm and be utilized as a stylus for touch-activated computer monitor screens. Alternately, a wireless multimodal device may have may have a provided on-off indicator light in its circuitry to allow a user to know when the device is turned on.

Alternately, the device may be made to operate as an in-air joystick with a weighted base and swivel-levered or track ball type of connection to the weighted portion. The weight would keep the XY axis switches horizontal and the multimodal device would swivel in-air and cause the pointer position to change relative to the weighted bottom piece.

Alternately, control ball cage devices may be made differently than as shown in the preferred embodiment and more conventional forms of ball caging be utilized. Alternately, in lieu of a set of rotatable supports, other support systems which lift the device may be used such as a levered cam-type support or a snap-in support system consisting of a rod parallel to the length of the device which rests beneath the lifted side.

Essence of Invention

The essence of a manually controlled multimodal pointer method for use with a computer with mouse control software with a connective circuitry method with a display screen with a pointer and cursor display, comprises: a. an elongated, graspable support control shell; b. a rotatable, multi-axis control ball with suitable sensor encoders, with a minimum of one side of the control ball protrudingly exposed from within the control shell; c. a plurality of mouse function keys configured so that a minimum of two said function keys are accessible to said manual control during all mode changes; d. a logic board for processing the encoded signals from the function keys and the sensors; e. electrical circuitry connections between the function keys, the sensors and the mouse control software within the computer, and the display screen with a pointer and cursor display, whereby the multimodal method may be minimally utilized in an in-air mode, a mouse mode and a trackball mode.

The embodiments described above are illustrative examples of the present invention and it should not be construed that the present invention is limited to those particular embodiments. Various changes and modifications may be effected by one skilled in the art without departing from the spirit or scope of the invention as defined in the appended claims.

I claim:

1. A manually controlled multimodal pointer method for use with a computer means with a mouse control software means with connective circuitry means with a display screen means with a pointer icon and a cursor icon displaying means, comprising:

providing an elongated, graspable support shell housing means, and providing a rotatable, multi-axis, control ball pointer controlling means with suitable sensor encoding means, with one side of said control ball pointer controlling means protrudingly exposed from within one side of said support shell housing means with said one side of said control ball pointer controlling means positioned to be operated by an index finger, and providing a plurality of mouse function keying means configured so that a minimum of two mouse function keying means are manually accessible during all mode changes, and providing a logic board processing means for said sensor encoding means and said mouse function keying means, and providing a connective electrical transferring means between said sensor encoding means and said mouse function keying means, and said logic board processing means, and said mouse control software means within said computer means, and said display screen means with a pointer and a cursor icon displaying means, and providing a circuit reverser switching means for said sensor encoding means, and providing a circuit reverser switching means for said minimum of two said mouse function keying means, whereby said multimodal pointer method may be minimally utilized in an in-air mode, a mouse mode and a trackball mode to control said pointer and cursor icon displaying means.

2. The method of claim 1 further including an auxiliary single-axis pointer-controller encoder means.

3. The method of claim 1 wherein said connective electrical means between said mouse function keying means, said sensor encoding means, said logic board processing means, and said mouse control software means within said computer means, further includes a wireless transmission means.

4. A manually controlled multimodal pointer method for use with a computer means with a mouse control software means with connective circuitry means with a display screen means with a pointer icon and a cursor icon displaying means, comprising:

providing an elongated, graspable support shell housing means, and providing a rotatable, multi-axis, control ball pointer controlling means with suitable sensor encoding means, with two sides of said control ball pointer controlling means protrudingly exposed from within two sides of said support shell housing means with said two sides of said control ball pointer controlling means positioned to be operated by an index finger, and providing a plurality of mouse function keying means configured so that a minimum of two mouse function keying means are manually accessible during all mode changes, and providing a logic board processing means for said sensor encoding means and said mouse function keying means, and providing a connective electrical transferring means between said sensor encoding means and said mouse function keying means, and said logic board processing means, and said mouse control software means within said computer means, and said display screen means with a pointer and a cursor icon displaying means, and providing a circuit reverser switching means for said sensor encoding means, and providing a circuit reverser switching means for said minimum of two said mouse function keying means, and providing a slide means for sliding said elongated, graspable support shell housing means along a flat surface while in a mouse mode, and providing a trackball support means for elevating one or more ends of said elongated, graspable support shell housing means upon a support surface while in a trackball mode, whereby said multimodal pointer method may be minimally utilized in an in-air mode, a mouse mode and a trackball mode to control said pointer and cursor icon displaying means.

5. The method of claim 4 further including an auxiliary single-axis pointer-controller encoder means.

6. The method of claim 4 wherein said connective electrical means between said mouse function keying means, said sensor encoding means, said logic board processing means, and said mouse control software means within said computer means, further includes a wireless transmission means.

7. A manually controlled multimodal pointer device for use with a computer means with a mouse control software means with connective circuitry means with a display screen means with a pointer and a cursor icon display means, comprising:

an elongated, graspable support shell housing means, with a rotatable, multi-axis control ball pointer control means with suitable sensor encoding means, with front, left and right sides of said control ball pointer control means protrudingly exposed from within said elongated, graspable support shell housing means and positioned to be operated by an index finger, and a plurality of mouse function keying means configured so that a minimum of two said mouse function keying means are manually accessible during all mode changes, and a logic board processing means for said sensor encoding means and said mouse function keying means, and a connective electrical means between said keying means, said sensor means, said logic board processing means, and said mouse control software means within said computer means, and said display screen means with a pointer and a cursor icon displaying means, whereby said manually controlled multimodal pointer device may be utilized to control said pointer and cursor icon display means.

8. The device of claim 7 further including a slide means for sliding said elongated, graspable support shell housing means along a flat surface while in a mouse mode.

9. The device of claim 7 further including a trackball support means for elevating one or more ends of said elongated, graspable support shell housing means upon a support surface while in a trackball mode.

10. The device of claim 7 further including a circuit reverser switching means for said sensor encoding means.

11. The device of claim 7 further including a circuit reverser switching means for said minimum of two said mouse function keying means.

12. The device of claim 7 further including an auxiliary single-axis pointer-controller encoder means.

13. The device of claim 7 wherein said connective electrical means between said mouse function keying means, said sensor encoding means, said logic board means, and said mouse control software means within said computer means, further includes a wireless transmission means.

14. The device of claim 7 further including a cooperative suspension stand means for independently supporting said elongated, graspable support shell housing means in an alternate operating mode.

15. The device of claim 7 further including a cooperative base stand means for independently supporting said elongated, graspable support shell housing means in an alternate operating mode.

16. The device of claim 7 wherein said connective electrical means between said mouse function keying means, said sensor encoding means, said logic board means, and said mouse control software means within said computer means, further includes a double-pin-plugged in-out cable means.

17. The device of claim 7 wherein said rotatable, multi-axis control ball pointer control means is supported by a set of ring collar means.

* * * * *